(12) United States Patent
Ebbers

(10) Patent No.: US 12,041,908 B2
(45) Date of Patent: Jul. 23, 2024

(54) DEVICE AND METHOD FOR SCENT TRAINING AN ANIMAL

(71) Applicant: EBBERS, Hans, Hörstel (DE)

(72) Inventor: Janek Ebbers, Hörstel (DE)

(73) Assignee: Hans EBBERS, Hörstel (DE)

( * ) Notice: Subject to any disclaimer, the term of this patent is extended or adjusted under 35 U.S.C. 154(b) by 65 days.

(21) Appl. No.: 17/943,619

(22) Filed: Sep. 13, 2022

(65) Prior Publication Data

US 2023/0000055 A1    Jan. 5, 2023

Related U.S. Application Data

(63) Continuation of application No. PCT/EP2021/056063, filed on Mar. 10, 2021.

(30) Foreign Application Priority Data

Mar. 13, 2020   (DE) .......................... 102020107060.8

(51) Int. Cl.
*A01K 15/02*   (2006.01)

(52) U.S. Cl.
CPC .................... *A01K 15/021* (2013.01)

(58) Field of Classification Search
CPC .... A01K 15/02; A01K 15/021; A01K 15/025; A01K 15/027; A01K 5/0114; A01K 29/00; A01K 29/005
See application file for complete search history.

(56) References Cited

U.S. PATENT DOCUMENTS

| 8,776,731 B1 * | 7/2014 | Curtis ................... A01K 15/02 119/720 |
| 2006/0174843 A1 * | 8/2006 | Poyner ................ A01K 15/027 119/712 |
| 2012/0077159 A1 * | 3/2012 | Araujo ................... A01K 1/035 434/236 |

(Continued)

FOREIGN PATENT DOCUMENTS

| CN | 202456062 | 10/2012 | |
| CN | 107787870 B | * 11/2023 | ........... A01K 15/027 |

(Continued)

OTHER PUBLICATIONS

International Search Report for International Application PCT/EP2021/056063, mailed May 21, 2021.

*Primary Examiner* — Monica L Perry
*Assistant Examiner* — Brook Victoria Schmid
(74) *Attorney, Agent, or Firm* — Burris Law, PLLC

(57) ABSTRACT

A device for scent training an animal includes a housing having a front panel in which at least one scent opening is formed, at least one sensor for each scent opening, at least one closeable target scent container for receiving a target scent substance, a coupling device for the target scent containers, a reward device for issuing a reward to the animal, and a control device coupled to the sensors, the coupling device, and the reward device. Each sensor monitors whether the animal puts its nose into the respective scent opening and sends a corresponding notification signal to the control device. The control device activates the coupling device and the reward device in dependence on the notification signals and/or according to a predetermined program.

16 Claims, 14 Drawing Sheets

(56) References Cited

U.S. PATENT DOCUMENTS

| | | | |
|---|---|---|---|
| 2014/0290583 A1* | 10/2014 | Yin | A01K 5/0114 |
| | | | 119/51.02 |
| 2016/0081302 A1* | 3/2016 | Hare | A01K 15/02 |
| | | | 119/712 |
| 2019/0008119 A1* | 1/2019 | Nolan | A01K 15/02 |
| 2021/0176963 A1* | 6/2021 | Helfers, III | A01K 15/02 |

FOREIGN PATENT DOCUMENTS

| | | | |
|---|---|---|---|
| EP | 2498238 | 9/2012 | |
| WO | WO-2012152319 A2 * | 11/2012 | A01K 15/02 |
| WO | WO-2018055230 A1 * | 3/2018 | A01K 15/02 |
| WO | 2019115983 | 6/2019 | |

* cited by examiner

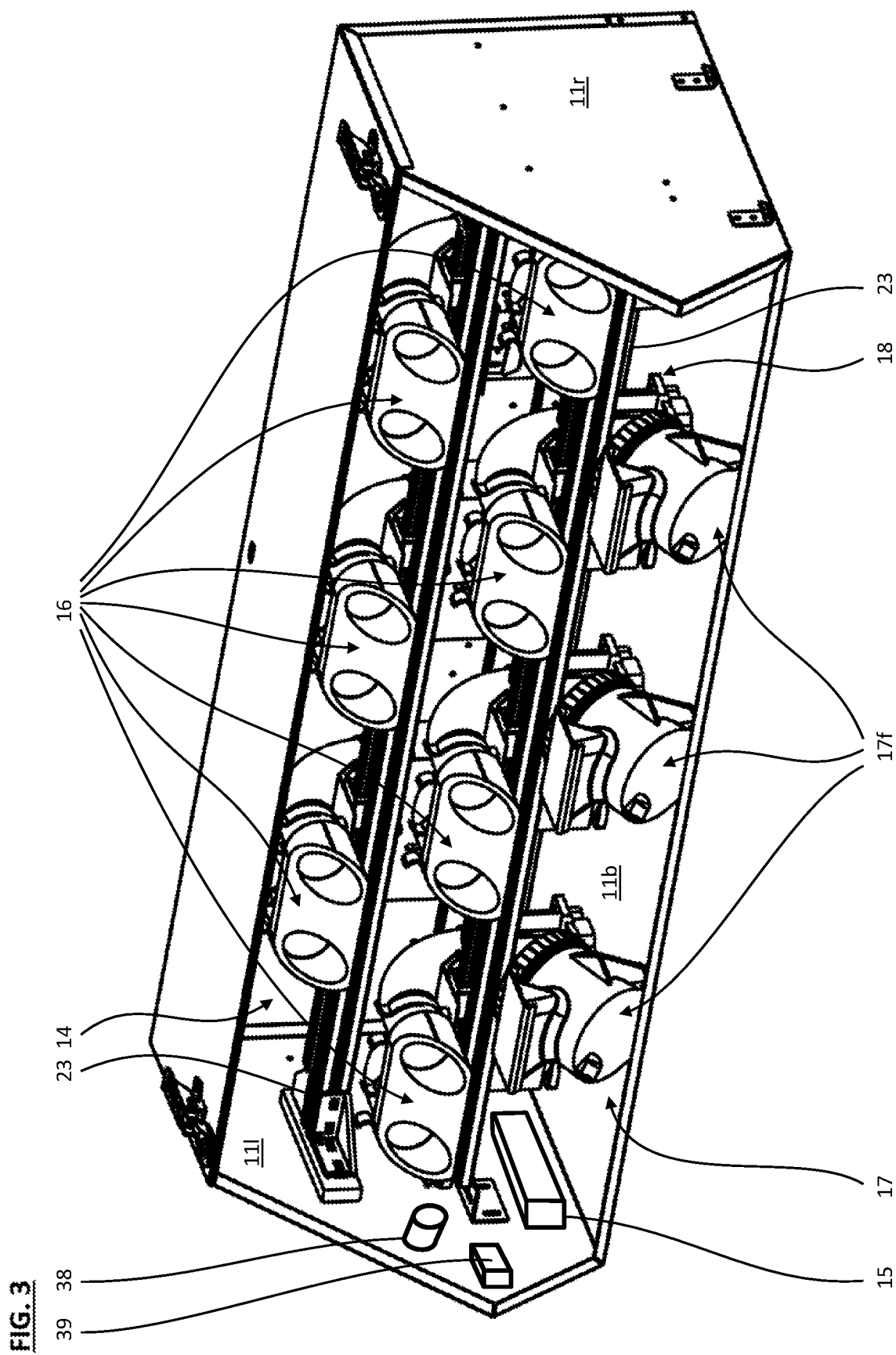

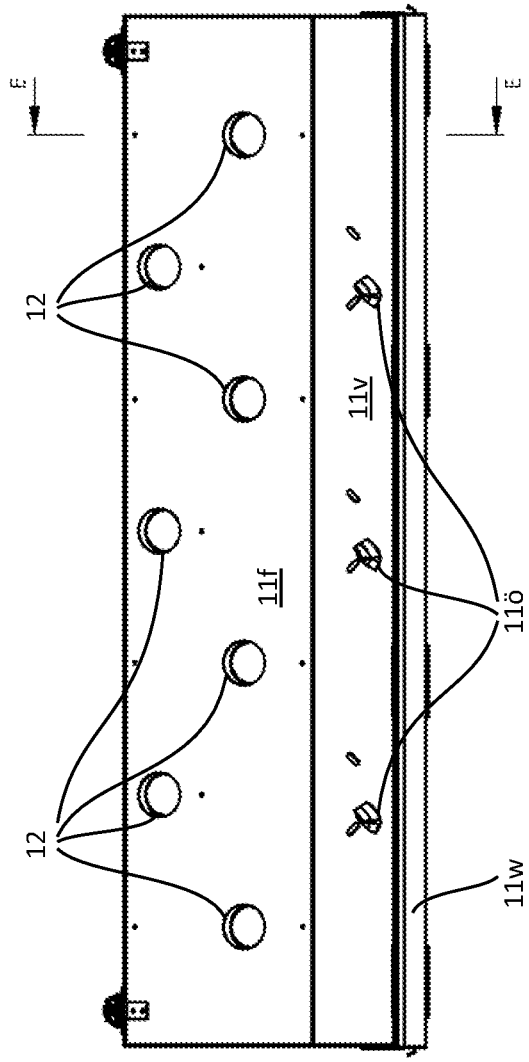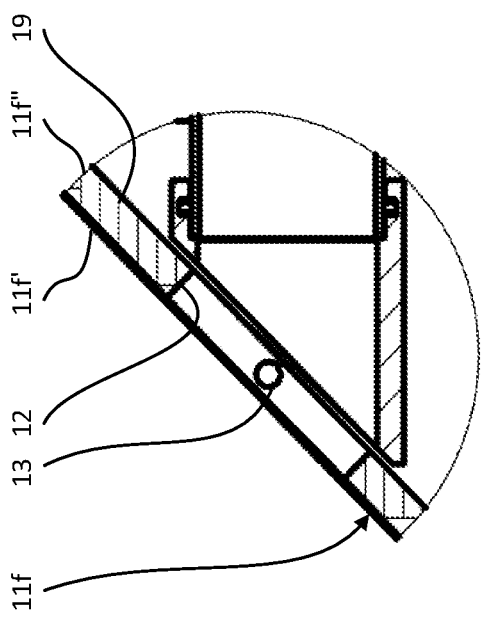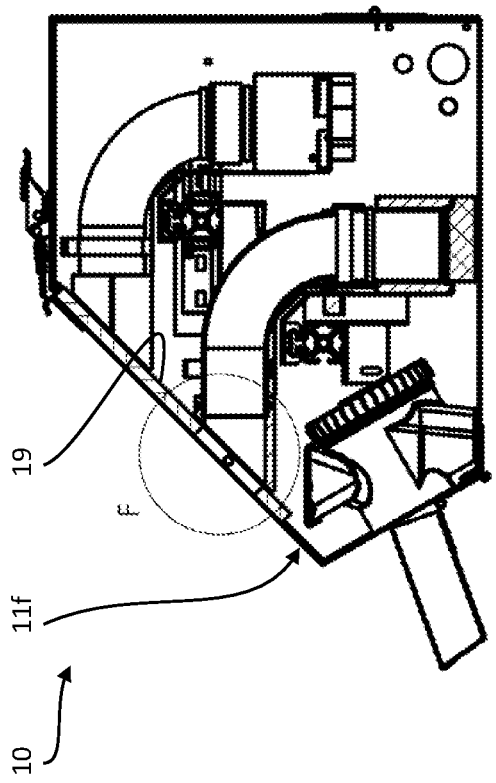

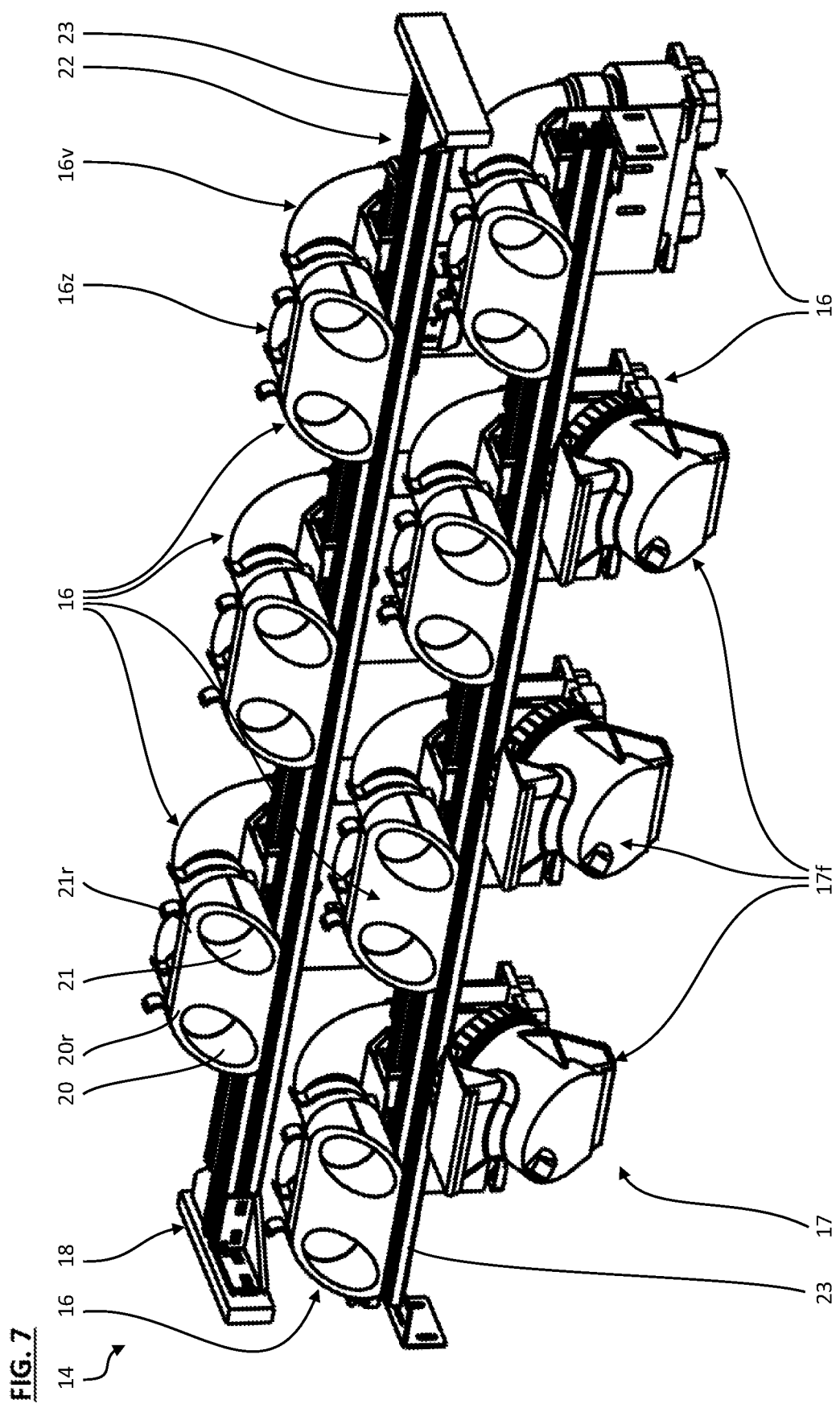

DEVICE AND METHOD FOR SCENT TRAINING AN ANIMAL

CROSS-REFERENCE TO RELATED APPLICATIONS

This application is a continuation of International Application No. PCT/EP2021/056063, filed on Mar. 10, 2021, which claims priority to and the benefit of German Patent Application No: 102020107060.8, filed on Mar. 13, 2020. The disclosures of the above applications are incorporated herein by reference.

FIELD

The present disclosure relates to a device and a method for scent training of an animal, in particular for scent training of dogs, cats, pigs, monkeys, giant pouched rats or rats.

BACKGROUND

The statements in this section merely provide background information related to the present disclosure and may not constitute prior art.

Within the context of the present disclosure, the use of the term "approximately" with respect to a value or range of values means a range of tolerance which a person skilled in the art considers to be usual for this value or range of values and which is in one form ±10%, in one form ±5% and in one form ±2%, and the use of the term "substantially" with respect to a property means a range of tolerance which is acceptable to the person skilled in the art from an economic and technical point of view to the extent that this property can still be recognized as such.

U.S. Pat. No. 8,776,731 B1, issued Jul. 15, 2014, describes an odor detection training system for use in training an animal to detect a desired odor. The system includes a plurality of decoy training housings and a desired odor housing containing a desired training odor. The housings are each visually identical. The housings are in different locations and are configured to be supported by a fence at different heights. The housings are removably attached to the fence. The desired odor housing is configured to receive an odor source within an odor storage area and a reward within a reward storage area and comprises an odor retention zone adjacent to and in fluidic communication with the odor storage area. Additionally, a reward release system associated with the desired odor housing is remotely operable by the trainer to dispense the reward directly into the odor retention zone. The odor storage area is a cavity within the desired odor housing that is adjacent to and physically separated from the odor retention zone by a sliding door. The use of the sliding door facilitates easy placement of the odor source within the odor storage area and serves to visually and physically shield the animal from the odor source. To fluidically connect the odor retention zone to the odor storage area, the door contains many openings. The reward release system comprises a structure associated with the desired odor housing that is remotely operable to cooperate with the reward storage area to dispense the reward therein to the odor retention zone. The release system is a combination of a battery, receiver, relay, and magnetic lock. The receiver can be remotely operated by a remote control transmitter. In operation, the transmitter is actuated by the trainer to activate the receiver, thereby actuating the relay to control the magnetic interlock which interacts with a metal strip on a trap door to release the trap door and drop the reward into the odor retention zone. If two or more of the desired odor housings are used, the transmitter is configured to allow the trainer to select the desired odor housing that he/she wants to activate at the appropriate time.

International Patent Publication No. WO 2019/115983 A1, filed on Nov. 15, 2018, discloses an odor training apparatus for training animals to detect odors. This odor training apparatus includes a carousel, a computer system, and a rodent enclosure. The carousel includes means for holding a plurality of odor sample pots at a plurality of odor sample positions and in an orientation to receive liquid samples. The carousel is rotatable about a carousel axis to provide a user-selected odor sample position at a predetermined presentation position. The rodent housing includes a sample window positioned in such a manner that it is located at the predetermined presentation position. The apparatus comprises means for covering a plurality of odor sample pots and means for exposing an odor sample pot at the sample window such that a sample can be presented at the sample window while an animal is trained on its odor. The computer system is programmed to control the odor training device.

SUMMARY

This section provides a general summary of the disclosure and is not a comprehensive disclosure of its full scope or all of its features.

According to a first aspect, the present disclosure proposes a device for scent training an animal comprising a housing having a front panel in which at least two scent openings are formed; at least one sensor for each scent opening; at least one closable target scent container for receiving a target scent; a coupling device for the at least one closeable target scent container; a reward device for issuing a reward to the animal; a control device coupled to the sensors, the coupling device, and the reward device; wherein each sensor is designed that it can monitor or recognize or sense or detect whether the animal puts or holds its nose into the respective scent opening, and provided this is the case, sends a corresponding notification signal to the control device; the coupling device is designed such that it can assume a closed state in which the at least one closeable target scent container is closed or is closed in a gas-tight and/or scent-tight manner, and can assume at least one coupling state in which at least one predetermined target scent container or at least one of the target scent containers is open and fluidically coupled to at least one predetermined scent opening or at least one of the scent openings; the control device is designed such that it can activate the coupling device and the reward device in dependence on the notification signals and/or according to a predetermined program.

According to a second aspect, the present disclosure proposes a use of a device designed according to the first aspect for scent training an animal.

According to a third aspect, the present disclosure proposes a method for scent training an animal, wherein in a step a, a housing having a front panel in which at least two scent openings are formed is provided, and at least one closeable target scent container for receiving a target scent substance is provided; in a step b, a target scent is filled into the at least one closeable target scent container; in a step c, a closed state is produced or generated or implemented or created in which the at least one closeable target scent container is closed; in a step d after the step c, a coupling state is produced or generated or implemented or created in which at least one predetermined target scent container is opened and fluidically coupled to at least one predetermined scent opening; in a step e after said step d, for the at least one of the coupled scent opening it is monitored whether the animal puts its nose into the respective scent opening, and provided this is the case, a corresponding notification signal is generated; in a step f after the step e, the animal is rewarded or not rewarded depending on the notification signals.

According to a fourth aspect, data are proposed which are generated by means of or using a device designed according to the first aspect and/or by means of or using a method designed according to the third aspect.

According to a fifth aspect, a data storage device is proposed in which data designed according to the fourth aspect are stored.

The present disclosure enables improved scent training of animals by at least reducing subjective influences by a trainer, such as can occur when using the odor recognition training system known from U.S. Pat. No. 8,776,731 B1.

The front panel can be formed in any manner as desired, in one form such that exactly two scent openings or at least one additional scent opening are/is formed therein. Each scent opening can be formed in any manner as desired, for example such that it is circular or oval, and/or such that its size and shape are adapted to the nose of the animal. In one form, the scent openings are identical to one another.

The device can be designed in any manner as desired, for example such that it comprises exactly one target scent container or at least one additional target scent container and/or exactly one sensor or at least one additional sensor for each scent opening. When the device is in operation, the target scent containers can contain different target scent substances, but it is also possible that at least two target scent containers contain the same target scent substance. Each sensor can be designed in any manner as desired, for example, as a photoelectric sensor, an IR photoelectric sensor, a thermal sensor, a proximity sensor, an optical, acoustic, inductive or capacitive proximity sensor, an ultrasonic proximity sensor or a Hall sensor.

The coupling device can be designed in any manner as desired, for example such that it can adopt exactly one coupling state or at least one additional coupling state.

Within the context of the present disclosure, the term "fluidically coupled" refers to coupling via a fluid line. In one form, the fluid line comprises at least one pipe and/or at least one hose and/or at least one channel formed in a component and/or at least one through-hole.

Each coupling state can be designed in any manner as desired, for example such that in this state, according to a first option, exactly one target scent container is open and is fluidically coupled to exactly one or at least two scent openings, and/or that in this state, according to a second option, at least two target scent containers are open and are jointly fluidically coupled to exactly one or at least two scent openings, and/or that in this state, according to a third option, at least two target scent containers are open and each of these target scent containers is fluidically coupled to exactly one or at least two scent openings. According to the first option, as an example in this application, a target scent container Z1 is fluidically coupled exclusively to one scent opening Ö1 or two scent openings Ö1 and Ö2. According to the second option, as an example in this application, two target scent containers Z1 and Z2 are jointly fluidically coupled exclusively to one scent opening Ö1 or two scent openings Ö1 and Ö2, so that that Z1 is coupled to Ö1 and also Z2 is coupled to Ö1 or Z1 is coupled to Ö1 and Ö2 and also Z2 is coupled to Ö1 and Ö2. According to the third option, as an example in this application, a target scent container Z1 is fluidically coupled exclusively to one scent opening Ö1 or two scent openings Ö1 and Ö2, and a target scent container Z2 is fluidically coupled exclusively to one scent opening Ö3 or two scent openings Ö3 and Ö4, so that Z1 is coupled to Ö1 and Z2 is coupled to Ö3, or Z1 is coupled to Ö1 and Z2 is coupled to Ö3 and Ö4, or Z1 is coupled to Ö1 and Ö2 and Z2 is coupled to Ö3 and Ö4.

In one form of the present disclosure, it is specified that the coupling device is designed such that it can assume at least two coupling states; the program comprises that the control device selects one of the coupling states at a predetermined first point in time, starts a first time measurement and activates the coupling device such that the coupling device assumes the selected coupling state; stops the first time measurement and simultaneously starts a second time measurement as soon as the control device receives the notification signal from one of the sensors associated with the at least one coupled target scent container; stops the second time measurement as soon as the control device no longer receives the notification signal from this sensor or as soon as a predetermined first period of time during which the control device has continuously received the notification signal from this sensor has elapsed; if the duration of the second time measurement exceeds a predetermined threshold or if the first time period has elapsed, activates the reward device at a predetermined second point in time after the second time measurement is stopped in such a manner that the reward device issues a predetermined reward.

Otherwise, that is, if the duration of the second time measurement does not exceed the threshold value or if the first time measurement has not elapsed, no reward is issued. The duration of the first time measurement indicates how long it took the animal to recognize the respective coupled target scent container or the target scent contained therein. The duration of the second time measurement indicates how long the animal has put its nose into the respective coupled scent opening. Exceeding the threshold serves as an indication that the animal has recognized the respective target scent. The threshold value can be selected in any manner as desired, for example, such that it is about 0.5 s, about 0.6 s, about 0.7 s, about 0.8 s, about 0.9 s, about 1.0 s, about 1.1 s, about 1.2 s, about 1.3 s, about 1.4 s, about 1.5 s, about 1.6 s, about 1.7 s, about 1.8 s, about 1.9 s, or about 2.0 s. This first time period can be selected in any manner as desired, for example, such that it is about 0.5 s, about 0.6 s, about 0.7 s, about 0.8 s, about 0.9 s, about 1.0 s, about 1.1 s, about 1.2 s, about 1.3 s, about 1.4 s, about 1.5 s, about 1.6 s, about 1.7 s, about 1.8 s, about 1.9 s, or about 2.0 s.

Selecting the coupling state can be done in any manner as desired, for example by means of a random number generator and/or a predetermined table.

Issuing the reward can be done in any manner as desired, for example such that a toy, such as a ball, and/or a treat or food chunk is dispensed or ejected.

Any determination of a point in time can be made in any manner as desired, for example by means of a random number generator and/or a predetermined table. In one form, the control device comprises the random number generator and/or a data memory in which the tables are stored.

In one form, the control device comprises a stopwatch or a timing device by means of which the time measurements are made.

In one form of the present disclosure, it is specified that the device comprises a signaling device for generating a signal for the animal; wherein the control device is coupled to the signaling device; the control device is designed such that it can activate the signaling device in dependence on the notification signals and/or according to the program.

The signaling device can be designed in any manner as desired, for example such that it comprises at least one lamp and/or at least one speaker and/or at least one vibrator. As an example, the signaling device is attached to a collar and/or a harness of the animal. In one form, the signal comprises an acoustic signal and/or a visual signal and/or a haptic signal. The acoustic signal comprises, for example, a click, such as produced by a clicker used in clicker training, and/or a whistle, such as produced by a dog whistle. The haptic signal comprises, for example, a vibration which, as an example, is produced on a collar and/or a harness of the animal.

In one form of the present disclosure, it is specified that the program comprises that the control device activates the signaling device at a predetermined third point in time after the second time measurement is stopped such that the signaling device generates a predetermined signal. This signal can then be used later during the animal's deployment in the field instead of a reward. If the duration of the second time measurement does not exceed the threshold or if the first time period has not elapsed, this signal is not generated.

In one form of the present disclosure, it is specified that the third point in time is equal to the second point in time or is a predetermined period of time before or after the second point in time.

This time period can be selected in any manner as desired, for example such that it is about 0.1 s, about 0.2 s, about 0.3 s, about 0.4 s, about 0.5 s, about 0.6 s, about 0.7 s, about 0.8 s, about 0.9 s, or about 1.0 s.

In one form of the present disclosure, it is specified that the program comprises that the control device stores and optionally associates the results of the time measurements with the respective sensors.

In one form of the present disclosure, it is specified that the program comprises that the control device cancels the first time measurement as soon as a predetermined second time period has elapsed without the control device having received a notification signal from one of those sensors associated with the coupled target scent containers.

Then, it is, in one form, specified that the program comprises that the control device stores the cancellation of the first time measurement. The expiration of the second timing period serves as an indication that the animal has not recognized a target scent.

In one form of the present disclosure, it is specified that the program comprises that the control device activates the coupling device such that the coupling device assumes the closed state before the first time period and/or after the second time period is stopped and/or after the first time period is canceled.

In one form of the present disclosure, it is specified that the control device is designed to execute a predetermined number of repetitions of the program and/or to execute the program repeatedly for a predetermined third period of time.

In one form of the present disclosure, it is specified that the program comprises that the control device changes the coupling state and/or at least one of the points in time upon each repetition of the program.

The changing of the coupling state and each changing of a point in time can be done in any manner as desired, for example by means of a random number generator and/or a predetermined table.

In one form of the present disclosure, it is specified that the device comprises at least one closure surface for the at least one closeable target scent container; wherein the at least one closeable target scent container has a closable target scent opening surrounded by a sealing edge; the coupling device comprises a drive device for the at least one closeable target scent container; the drive device is designed such that it can move the at least one closeable target scent container into a first position in which the respective sealing edge rests completely and/or sealingly against the closure surface or against one of the closure surfaces in such a manner that the respective target scent opening is closed; can move the at least one closeable target scent container into a second position in which the respective target scent opening and those scent openings associated with this target scent opening according to the selected coupling state at least partially overlap.

Each of these closure surfaces can be formed in any manner as desired, for example on the inside of the front panel.

In one form of the present disclosure, it is specified that the device comprises at least one cover having a closure surface for the at least one closeable target scent container; wherein the at least one closeable target scent container has a closable target scent opening enclosed by a sealing edge; the coupling device comprises a drive device for the at least one cover; the drive device is designed such that it can move the at least one cover into a first position in which the respective closure surface rests completely and/or sealingly against at least one of the sealing edges in such a manner that the respective target scent opening is closed; can move the at least one cover into a second position in which the respective sealing surface does not rest completely or sealingly against any of the sealing edges.

In one form of the present disclosure, it is specified that in the second position of one of these covers, at least one of those target scent openings predetermined according to the selected coupling state and those scent openings associated with those target scent openings according to the selected coupling state at least partially overlap.

The device can be designed in any manner as desired, for example such that it comprises exactly one of these covers or at least one additional cover. Each of these covers can be designed in any manner as desired, for example such that it is associated with exactly one or at least one of the target scent containers. The device comprises, for example, exactly one common cover for all target scent containers together, or it comprises, for example, a separate cover for each target scent container.

In one form of the present disclosure, it is specified that the device comprises at least one closable decoy scent container for receiving a decoy scent substance; wherein the coupling device is or forms or constitutes a coupling device for the at least one decoy scent container; in the closed state, the at least one decoy scent container is closed or sealed in a gas-tight and/or scent-tight manner; in the coupling state or in at least one of the coupling states, at least one predetermined decoy scent container or at least one of the decoy scent containers is opened and fluidically coupled to at least one predetermined scent opening or at least one of the scent openings, and/or in the coupling state or in at least one of the coupling states, at least one predetermined decoy scent container or at least one of the decoy scent containers is opened and fluidically coupled to at least one predetermined scent opening or at least one of the scent openings and the at least one closeable target scent container is closed.

The device can be designed in any manner as desired, for example such that it comprises exactly one decoy scent container or at least one additional decoy scent container. When the device is in operation, the decoy scent containers can contain different decoy scents, but it is also possible for at least two decoy scent containers to contain the same decoy scent.

Each coupling state can be designed in any manner as desired, for example in such a manner that, according to a first option, exactly one decoy scent container is opened in this state and is fluidically coupled to exactly one or at least two scent openings, and/or that, according to a second option, at least two decoy scent containers are opened in this state and are jointly fluidically coupled to exactly one or at least two scent openings, and/or that, according to a third option, at least two decoy scent containers are opened in this state and each of these decoy scent containers is fluidically coupled to exactly one or at least two scent openings. According to the first option, a decoy scent container V1, as an example, is fluidically coupled exclusively to one scent opening Ö1 or two scent openings Ö1 and Ö2. According to the second option, as an example, two decoy scent containers V1 and V2 are jointly fluidically coupled exclusively to one scent opening Ö1 or two scent openings Ö1 and Ö2 such that V1 is coupled to Ö1 and also V2 is coupled to Ö1, or V1 is coupled to Ö1 and Ö2 and also V2 is coupled to Ö1 and Ö2. According to the third option, as an example, a decoy scent container V1 is fluidically coupled exclusively to one scent opening Ö1 or two scent openings Ö1 and Ö2, and a decoy scent container V2 is fluidically coupled exclusively to one scent opening Ö3 or two scent openings Ö3 and Ö4 so that V1 is coupled to Ö1 and V2 is coupled to Ö3, or V1 is coupled to Ö1 and V2 is coupled to Ö3 and Ö4, or V1 is coupled to Ö1 and Ö2 and V2 is coupled to Ö3, or V1 is coupled to Ö1 and Ö2 and V2 is coupled to Ö3 and Ö4.

In one form of the present disclosure, it is specified that the device comprises at least one closure surface for the at least one decoy scent container; wherein the at least one decoy scent container has a closable decoy scent opening surrounded by a sealing edge; the coupling device comprises a drive device for the at least one decoy scent container; the drive device is designed such that it can move the at least one decoy scent container into a first position in which the respective sealing edge can rest completely and/or sealingly against the closure surface or against one of the closure surfaces in such a manner that the respective decoy scent opening is closed; can move the at least one decoy scent container into a second position in which the respective decoy scent opening and those scent openings which are associated with this decoy scent opening according to the selected coupling state at least partially overlap.

Each of these closure surfaces can be formed in any manner as desired, for example on the inside of the front panel.

In one form of the present disclosure, it is specified that the device comprises at least one cover having a closure surface for the at least one decoy scent container; wherein the at least one decoy scent container has a closable decoy scent opening surrounded by a sealing edge; the coupling device comprises a drive device for the at least one cover; the drive device is designed such that it can move the at least one cover into a first position in which the respective closure surface completely and/or sealingly rests against at least one of the sealing edges in such a manner that the respective decoy scent opening is closed; can move the at least one cover into a second position in which the respective closure surface does not rest completely or sealingly against any of the sealing edges.

In one form of the present disclosure, it is specified that in the second position of one of these covers at least one of those scent openings which are predetermined according to the selected coupling state and those scent openings which are associated with these scent openings according to the selected coupling state at least partially overlap.

The device can be designed in any manner as desired, for example such that it comprises exactly one of these covers or at least one additional cover. Each of these covers can be designed, for example such that it is associated with exactly one or at least one of the decoy scent containers. For example, the device comprises exactly one common cover for all the decoy scent containers together, or it comprises a separate cover for each decoy scent container, for example.

In one form of the present disclosure, it is specified that in the closed state, the target scent openings and/or the decoy scent openings are closed or are closed in a gas-tight and/or scent-tight manner.

In one form of the present disclosure, it is specified that each target scent container contains a target scent substance and/or each decoy scent container contains a decoy scent substance.

The device can be designed in any manner as desired, for example such that the target scent containers contain different target scent substances, but it is also possible that at least two target scent containers contain the same target scent substance, and/or such that the decoy scent containers contain different decoy scent substances, but it is also possible that at least two decoy scent containers contain the same decoy scent substance.

In one form of the present disclosure, it is specified that the device comprises a temperature control device for at least one of the scent containers; wherein the control device is coupled to the temperature control device; the control device is designed such that it can activate the temperature control device in dependence on the notification signals and/or according to the program.

The temperature control device is configured to bring each of the associated scent containers and/or each of the scent substances contained in those scent containers to a predetermined temperature.

The temperature control device allows the training to be adapted to the climatic conditions that will exist at a later location of the animal's deployment.

The temperature control device can be designed in any manner as desired, for example such that it comprises exactly one or at least one heating device and/or exactly one or at least one cooling device.

In one form of the present disclosure, it is specified that the program comprises that the control device activates the temperature control device such that the temperature control device brings each of the respective scent containers and/or each of the respective scent substances to a predetermined temperature prior to the first point in time.

In one form of the present disclosure, it is specified that the program comprises that the control device does not start the first time measurement until the predetermined temperatures are reached.

In one form of the present disclosure, it is specified that the reward device comprises at least one feed container and/or at least one toy container.

In one form of the present disclosure, it is specified that the device comprises at least one data memory which is coupled to the control device and in which at least part of the program and/or at least part of the data desired by the program and/or at least part of the data processed by the program is stored.

The data desired by the program comprise, in one form, the tables. The data processed by the program comprise, in one form, the results of the time measurements and the cancellation of the first time measurement.

Each of the data memories can be designed in any manner as desired, for example according to the fifth aspect and/or such that it comprises at least one semiconductor memory and/or at least one flash memory and/or at least one hard disk drive and/or at least one memory card and/or at least one USB memory stick.

In one form of the present disclosure, it is specified that the device comprises a remote control device for the control device; a communication device capable of establishing a wireless and/or wired connection between the control device and the remote control device.

The remote control device is configured to remotely control or operate the control device.

In one form, the proposed method is carried out using a device designed according to the first aspect.

In one form of the proposed method, it is specified that in the step d the coupling state is selected from a plurality of predetermined coupling states, and at a predetermined first point in time, a first time measurement is started and the selected coupling state is produced or generated or implemented or created; in the step e, the first time measurement is stopped and a second time measurement is started simultaneously as soon as one of the notification signals is generated, and the second time measurement is stopped as soon as the notification signal is no longer generated or as soon as a predetermined first period of time during which this notification signal has been continuously generated has elapsed; in step f, if the duration of the second time measurement exceeds a predetermined threshold or if the first time period has elapsed, the animal is rewarded in a predetermined manner at a predetermined second point in time after the second time measurement has stopped.

Otherwise, that is, if the duration of the second time measurement does not exceed the threshold or if the first time period has not elapsed, the animal is not rewarded.

In one form of the proposed method, it is specified that in step f, a predetermined signal for the animal is generated in dependence on the detection signals.

In one form of the proposed method, it is specified that generating the signal for the animal takes place at a predetermined third point in time after stopping the second time measurement.

If the duration of the second time measurement does not exceed the threshold or if the first time period has not elapsed, the signal for the animal is not generated.

In one form of the proposed method, it is specified that the results of the time measurements are stored. This is, in one form, done by means the data memory of the device.

In one form of the proposed method, it is specified that after stopping the second time measurement, the closed state is established, generated, implemented, or created, for example in step e or f.

In one form of the proposed method, it is specified that in step e, the first time measurement is canceled as soon as a predetermined second time period has elapsed without any of the notification signals having been generated.

Then it is, in one form, specified that the cancelation of the first time measurement is stored. In one form, this is done by means of the data memory of the device.

In one form of the proposed method, it is specified that in a step g, after the step f, a jump is made to the step c or d; the number of executions of step g is predetermined and/or limited by a predetermined third time period.

Then, it is, in one form, specified that in the step g, the coupling state and/or at least one of the points in time is changed.

In one form of the proposed method, it is specified that in step a, at least one closable decoy scent container for receiving a decoy scent substance is provided; in step b, a decoy scent substance is filled into the at least one decoy scent container; in the closed state, the at least one decoy scent container is closed; in the coupling state, at least one predetermined decoy scent container is opened and fluidically coupled to at least one predetermined scent opening; and/or in the coupling state, at least one predetermined decoy scent container is opened and fluidically coupled to at least one predetermined scent opening and the at least one closeable target scent container is closed.

In one form of the proposed method, it is specified that prior to step d or prior to the first point in time, at least one of the scent containers is brought to a predetermined temperature.

As an example, the data proposed according to the fourth aspect comprise the results of the time measurements and the cancelation of the first time measurement.

Each of the proposed methods can be exemplarily performed by means of any one of the proposed devices or by using any one of the proposed methods. As in one form, each of the proposed devices can be designed or can serve or can be suitable in such a manner that it performs or can perform any one of the proposed methods.

The explanations of one of the aspects of the present disclosure, in one form of individual features of that aspect, apply mutatis mutandis to the other aspects of the present disclosure in.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 3 is a perspective view of the device of FIG. 2, with the front part removed, according to the teachings of the present disclosure;

FIG. 4 is a front view of the device of FIG. 1, according to the teachings of the present disclosure;

FIG. 5 is a sectional view along line E-E of the device of FIG. 4, according to the teachings of the present disclosure;

FIG. 6 is a detailed view of a portion of the device of the detail F of FIG. 5, according to the teachings of the present disclosure;

FIG. 7 is a perspective view of one form of a functional group of the device of FIG. 2, according to the teachings of the present disclosure;

Figure 1:
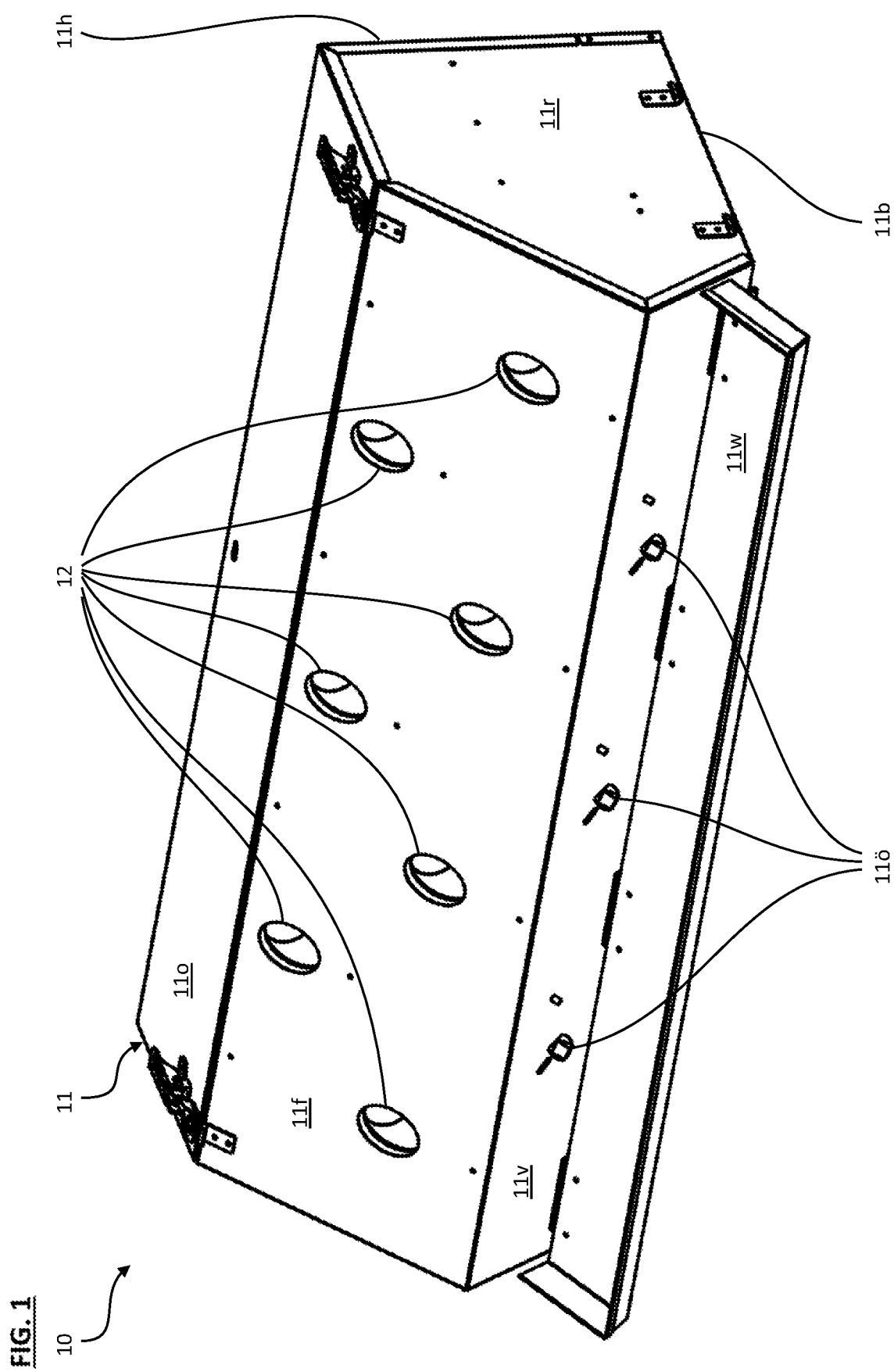
FIG. 1 is a perspective view of, in one form, a device for the scent training of an animal, wherein a feed pan is pivoted out, according to the teachings of the present disclosure.
Figure 2:
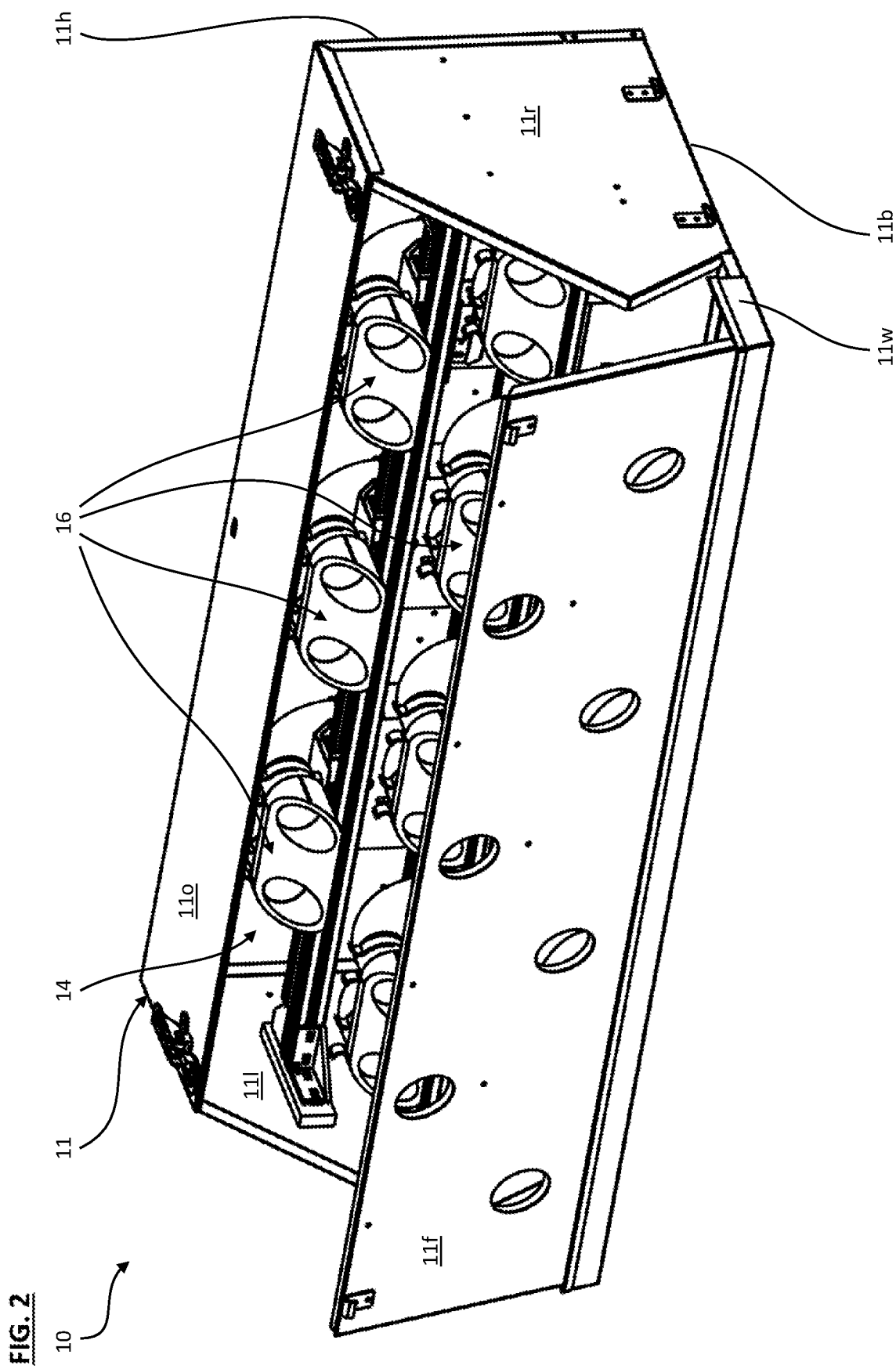
FIG. 2 is a perspective view of the device of FIG. 1, wherein the feed pan is pivoted in and a front part is pivoted out, according to the teachings of the present disclosure.
Figure 8:
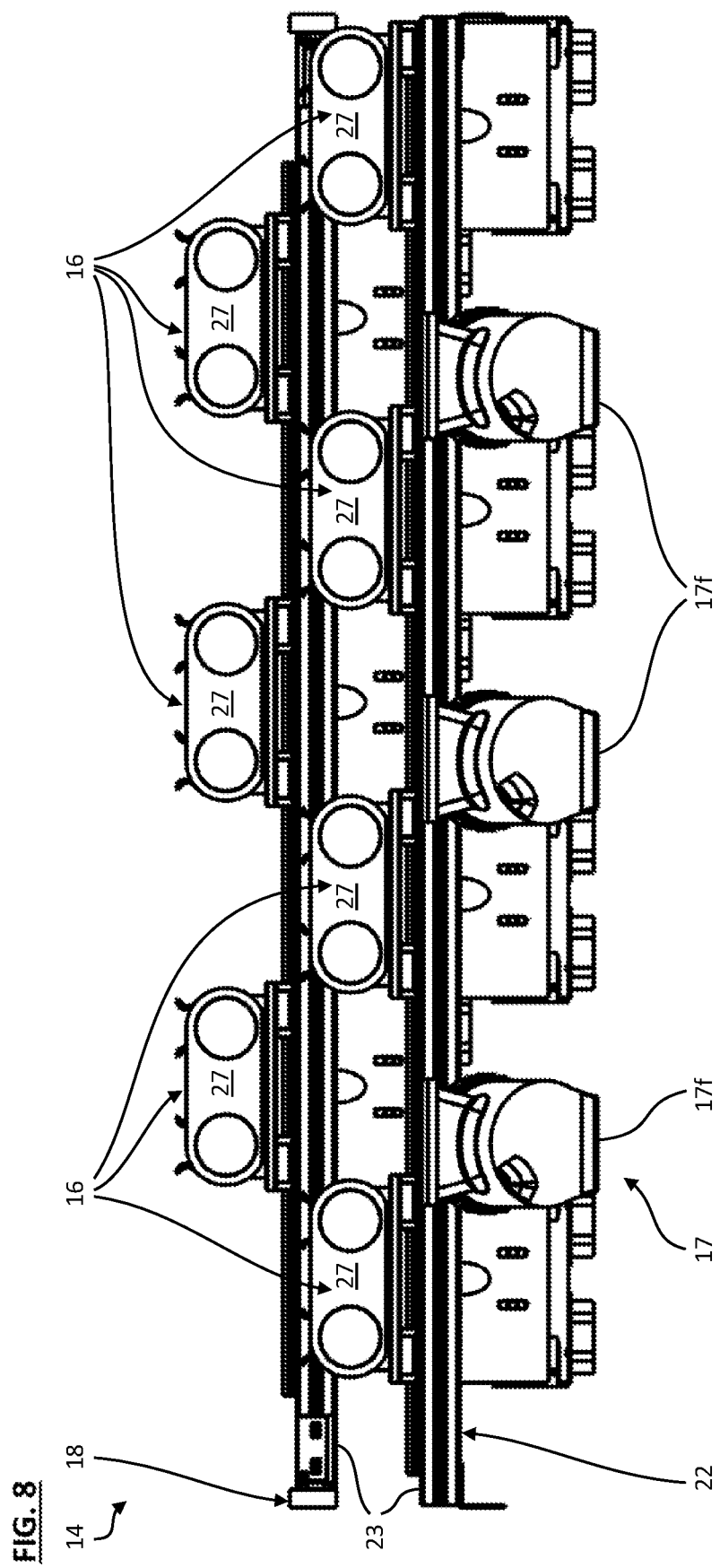
FIG. 8 is a front view of the functional group of FIG. 7, according to the teachings of the present disclosure.
Figure 9:
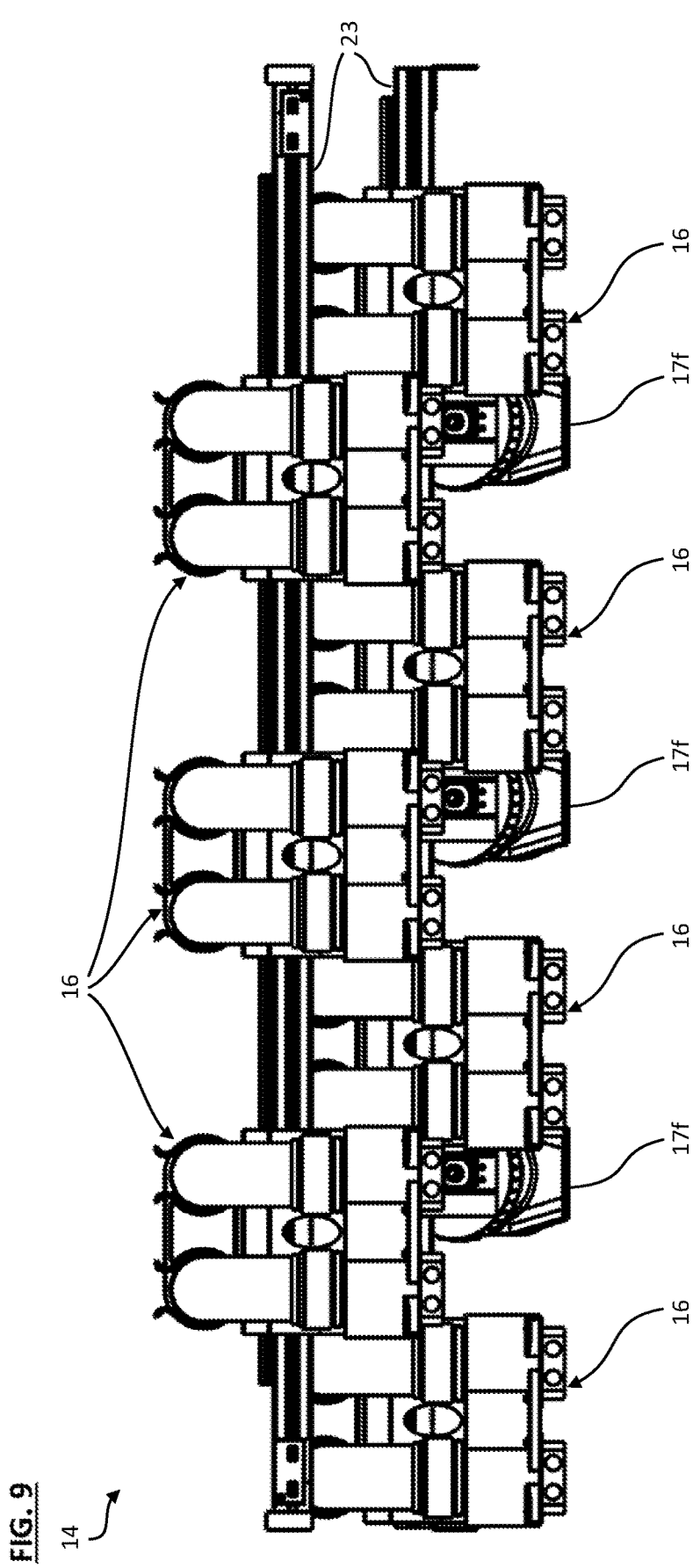
FIG. 9 is a rear view of the functional group of FIG. 7, according to the teachings of the present disclosure.
Figure 10:
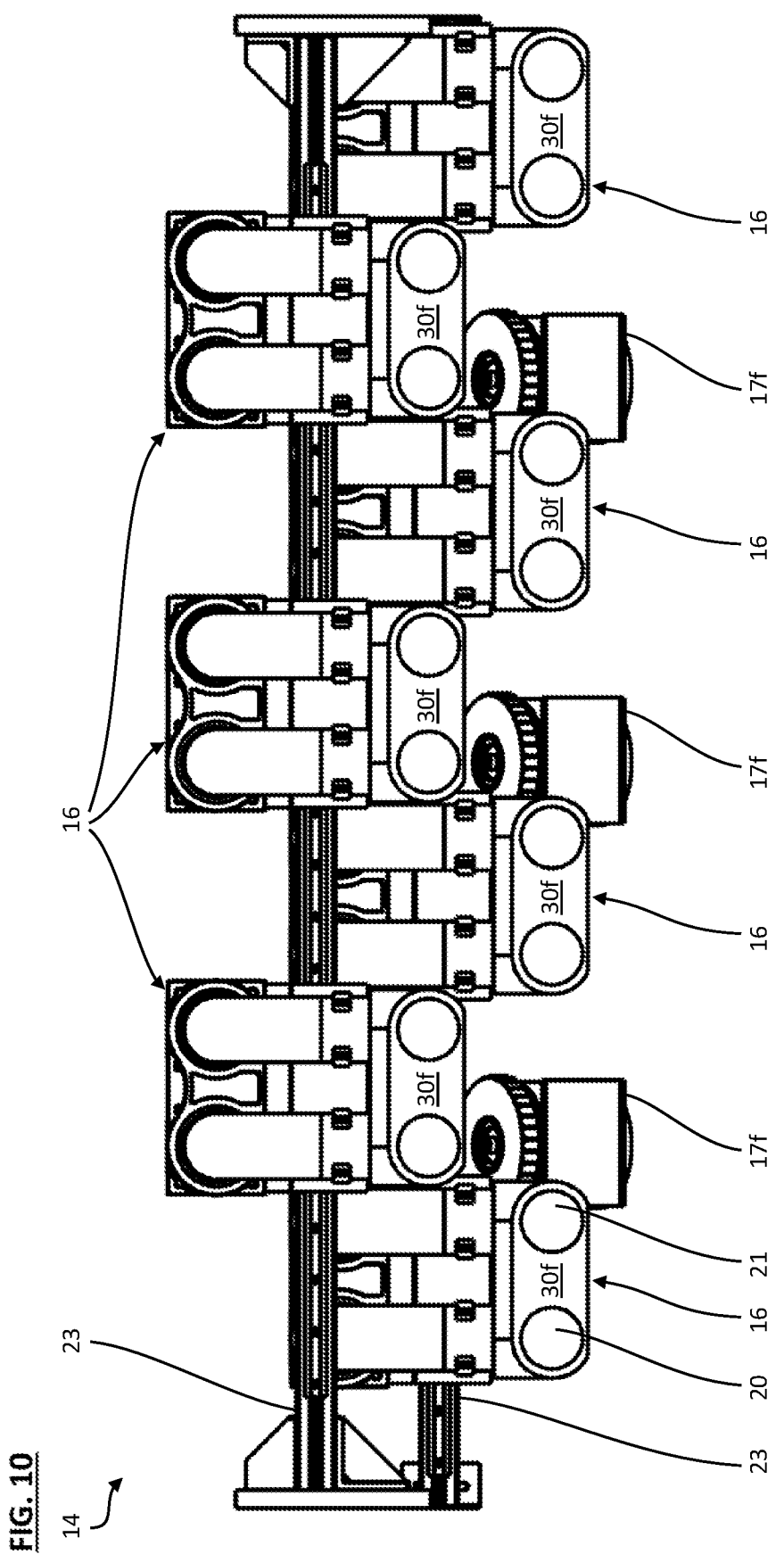
FIG. 10 is a top view of the functional group of FIG. 7, according to the teachings of the present disclosure.
Figure 12:
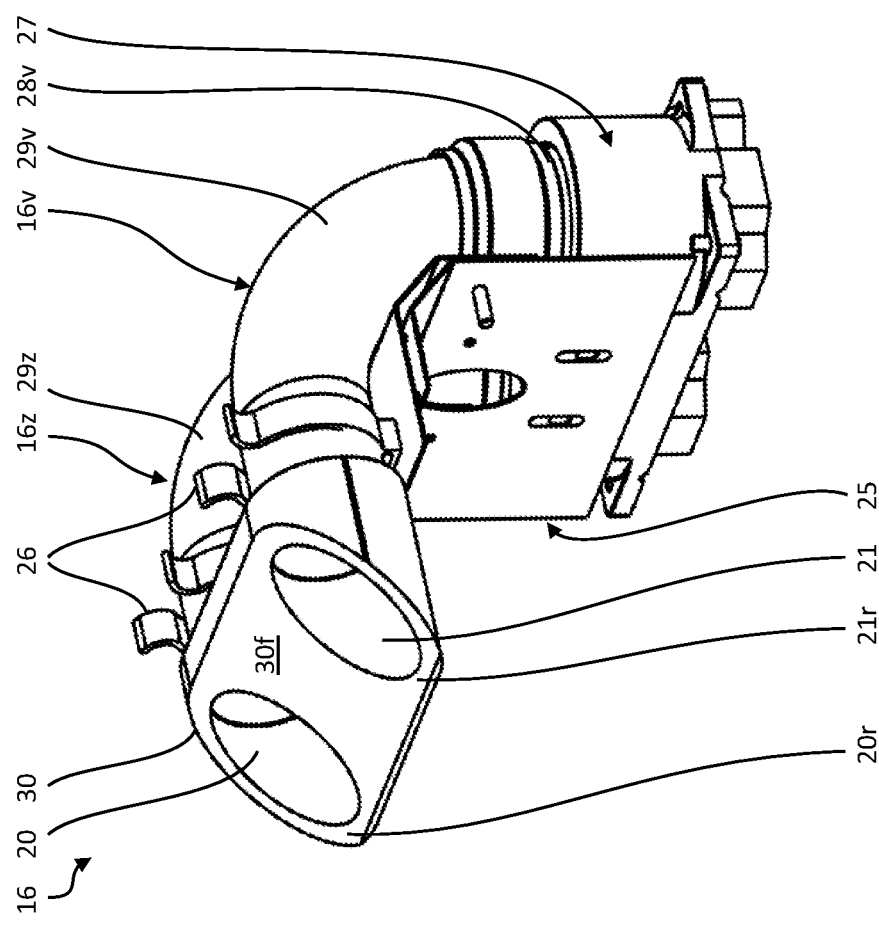
FIG. 12 is a perspective view, in one form, of a scent group of the functional group of FIG. 7, according to the teachings of the present disclosure.
Figure 11:
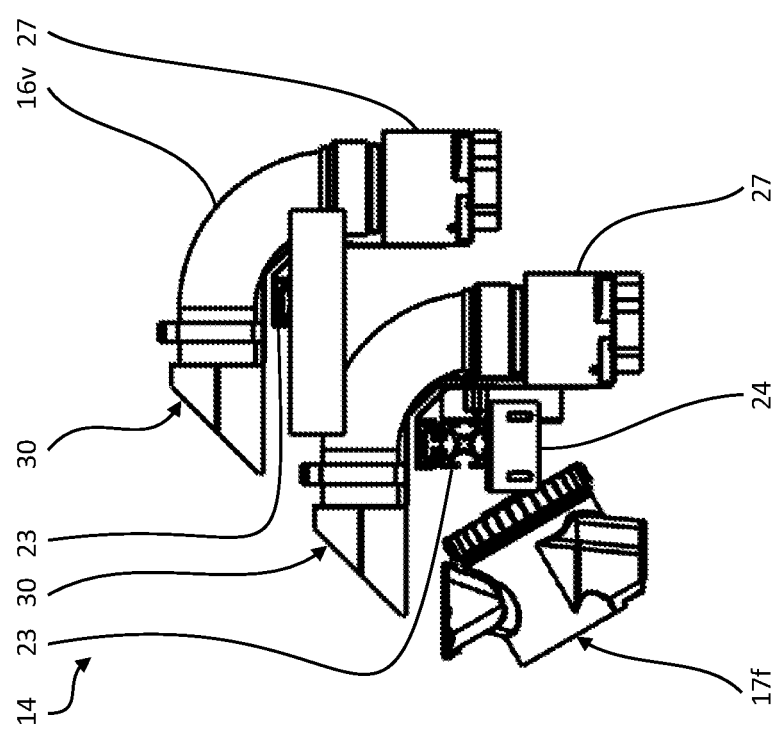
FIG. 11 is a side view from the right of the functional group of FIG. 7, according to the teachings of the present disclosure.
Figure 14:
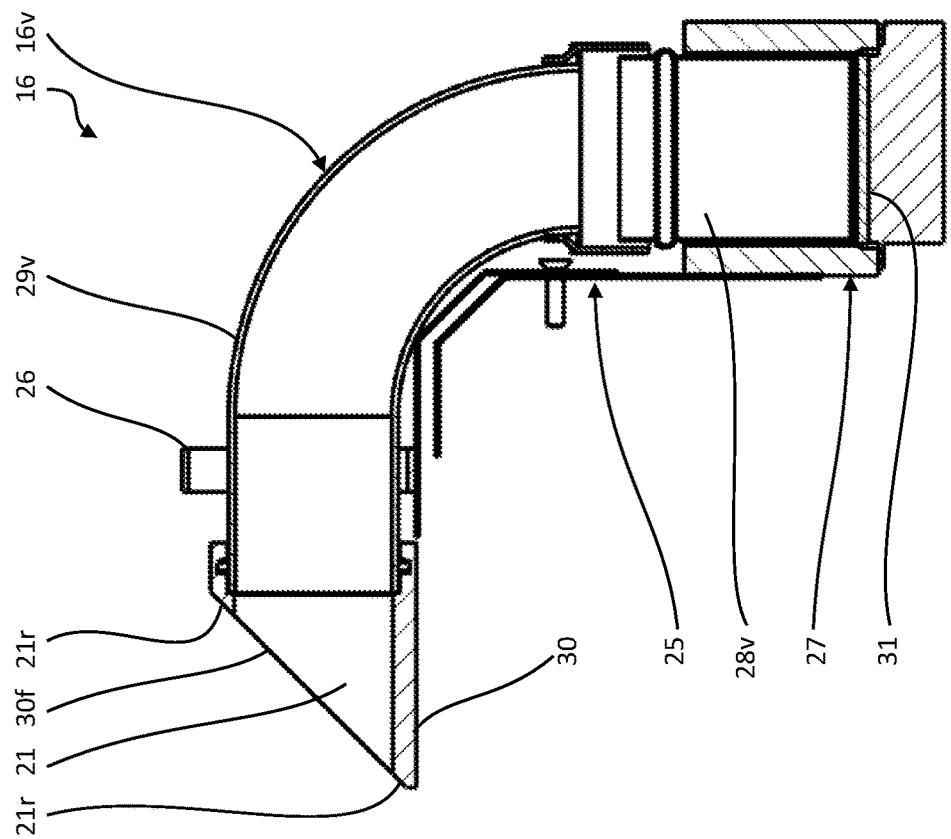
FIG. 14 is a sectional view along the line C-C the scent group of FIG. 13, according to the teachings of the present disclosure.
Figure 13:
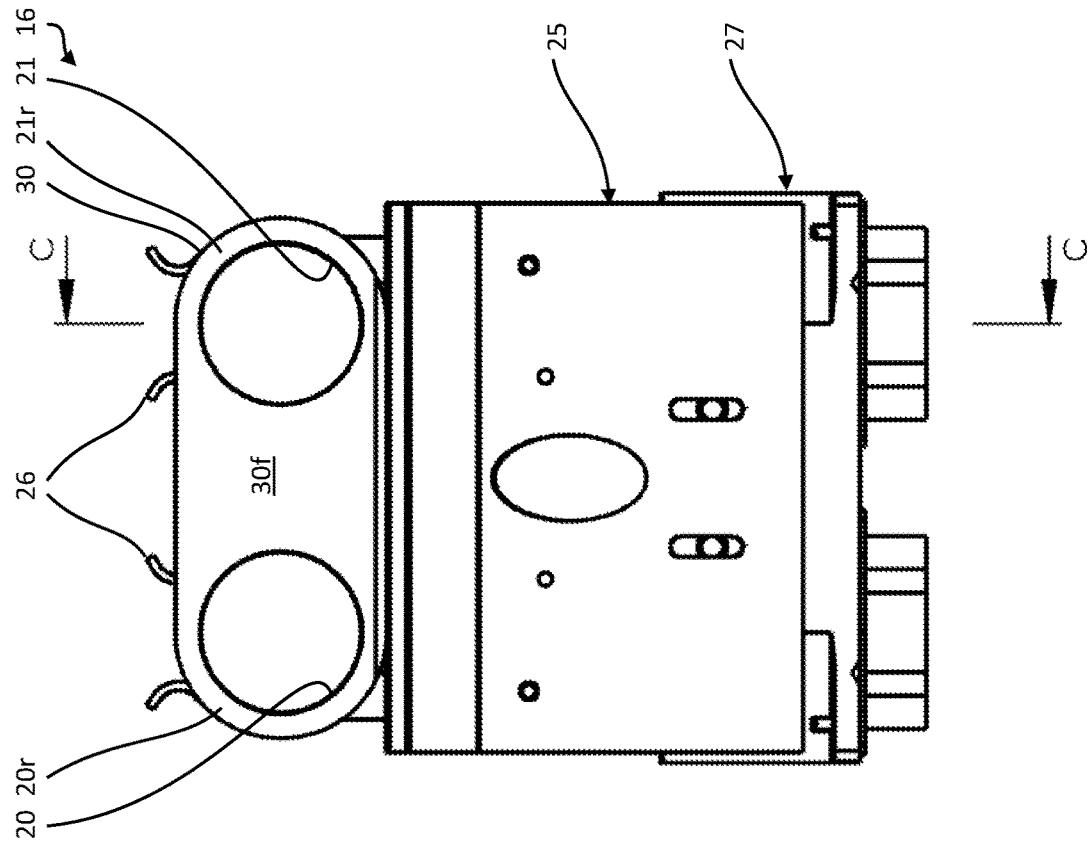
FIG. 13 is a front view to the scent group of FIG. 12, according to the teachings of the present disclosure.
Figure 15:
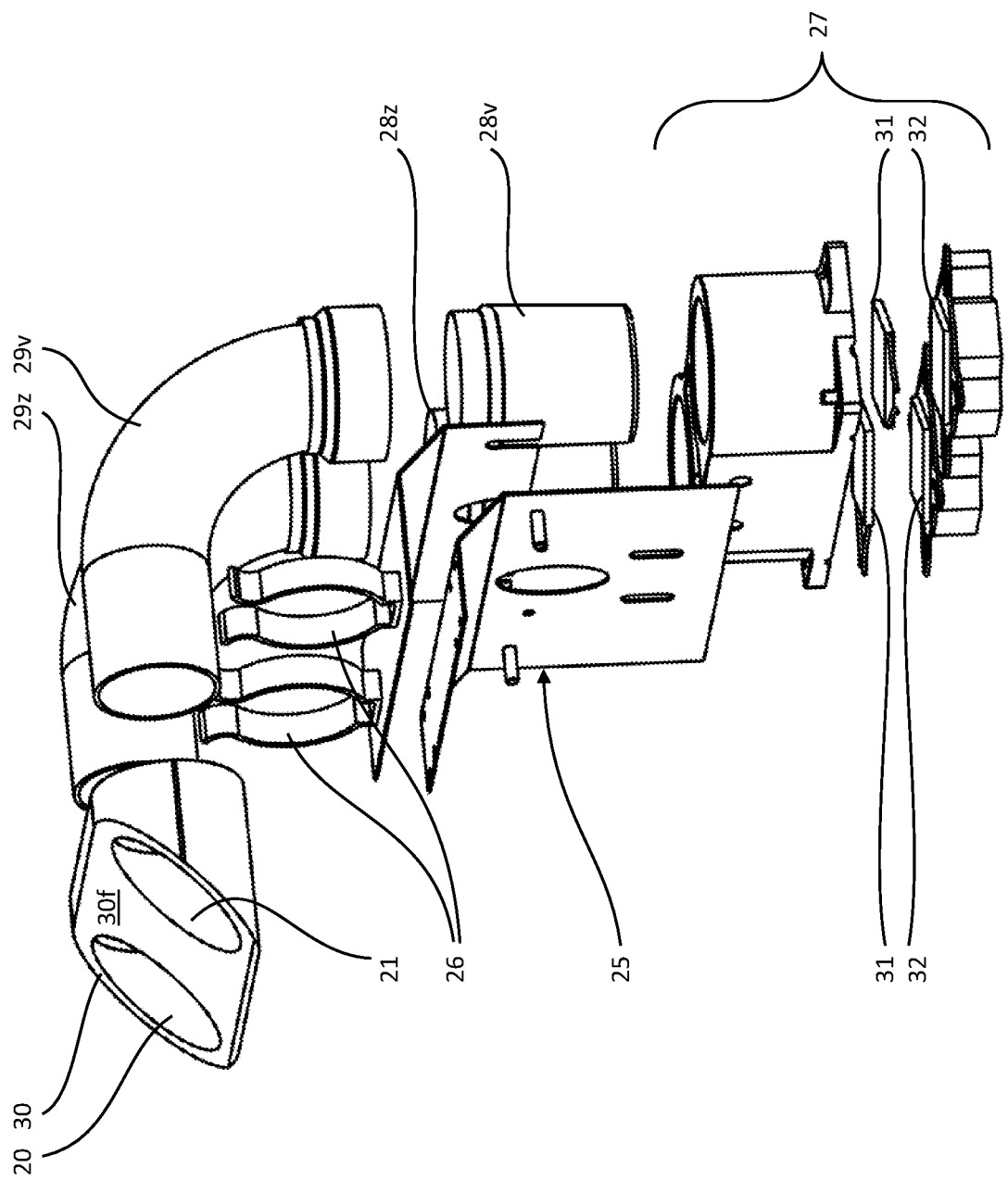
FIG. 15 is an exploded view of the scent group of FIG. 12, according to the teachings of the present disclosure.
Figure 16:
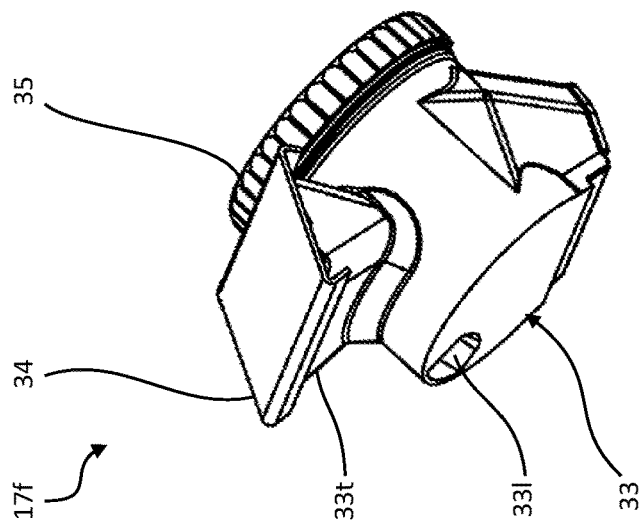
FIG. 16 is a perspective view of one form of a feed container of the functional group of FIG. 7, according to the teachings of the present disclosure.
Figure 17:
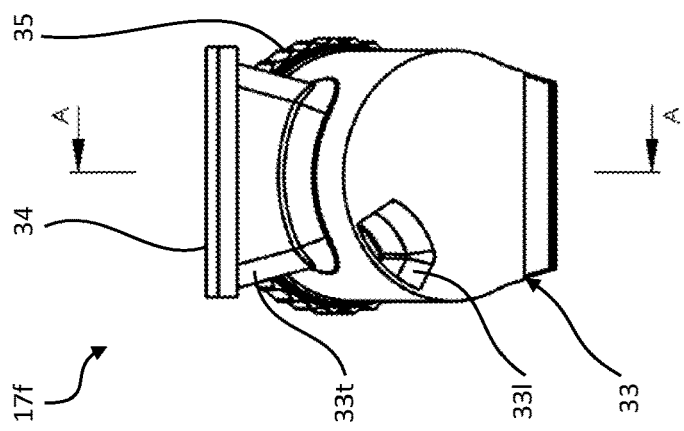
FIG. 17 is a front view of the feed container of FIG. 16, according to the teachings of the present disclosure.
Figure 18:
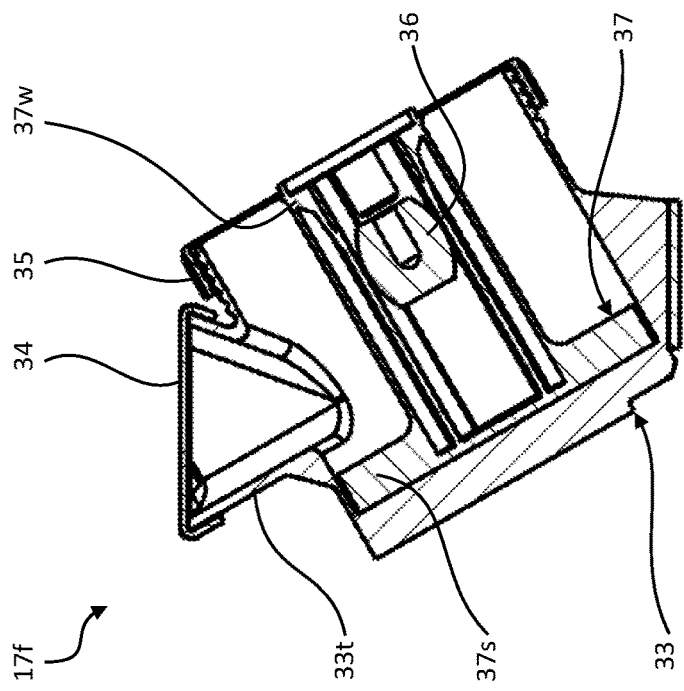
FIG. 18 is a sectional view along line A-A of the feed container of FIG. 17, according to the teachings of the present disclosure.
Figure 19A:
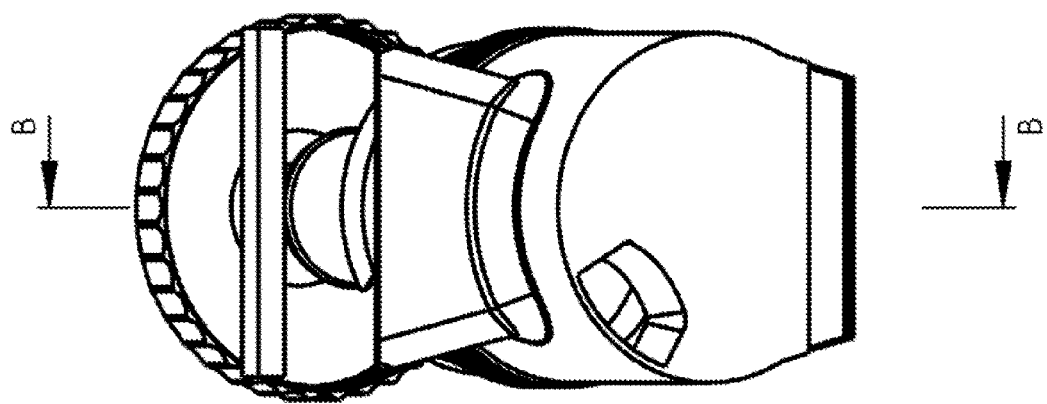
FIG. 19a is a front view of the feed container of FIG. 18, according to the teachings of the present disclosure.
Figure 19B:
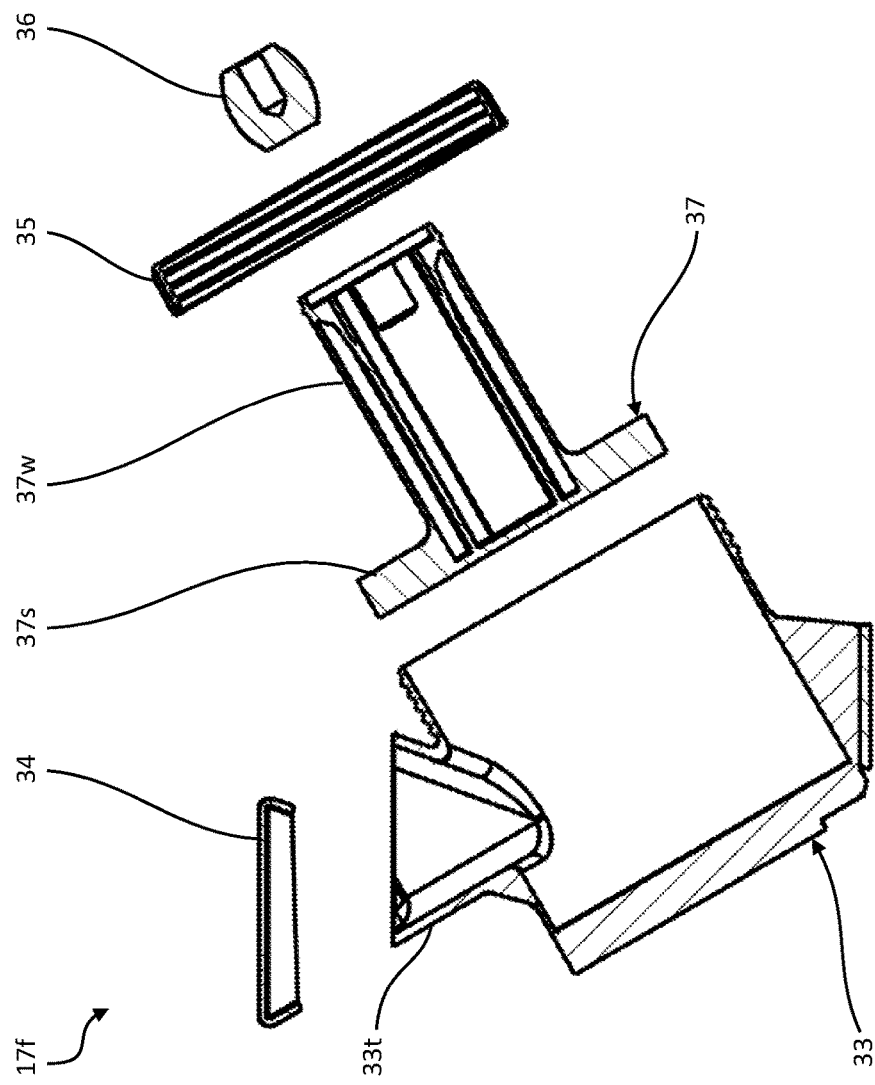
FIG. 19b shows a sectional-exploded view along line B-B of the feed container of FIG. 19a, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, FIG. 2, FIG. 3, FIG. 4, FIG. 5 and FIG. 6, in one form of a device 10 according to the present disclosure for scent training an animal is schematically shown, which, as an example, is designed for the scent training of a dog. The device 10 comprises a housing 11 which, in one form, is closed on all sides and comprises a front panel 11f, a feed pan 11w, a front part 11v with three feed openings 11ö, a bottom panel 11b, a rear panel 11h, a top panel 11o and a left and a right side panel 11l, 11r.

Front panel 11v, bottom panel 11b, rear panel 11h, top panel 11o, feed pan 11w, and side panels 11l, 11r are, in one form, made of stainless steel sheet or galvanized sheet. As in one form, the front panel 11f comprises an outer layer 11f', which is, in one form, made of stainless steel sheet or galvanized sheet, and an inner layer 11f'', which rests against the inner side of the outer layer 11f' and, as an example, is made of a plastic, such as a thermoplastic, polyethylene (PE), polypropylene (PP), polytetrafluoroethylene (PTFE) or polyurethane (PUR). However, it is also possible that, for example, the inside of the outer layer 11f' is coated with such a plastic.

Front panel 11f, front panel 11v, bottom panel 11b, rear panel 11h, top panel 11o and feed pan 11w each have a rectangular basic shape. The side panels 11l, 11r have a pentagonal basic shape having a lower edge extending horizontally rearward, a rear edge extending vertically upward therefrom, an upper edge extending horizontally forward therefrom, an upper front edge extending obliquely forward-downward therefrom, and a lower front edge extending obliquely rearward-downward therefrom. The lower edge and the rear edge, as in one form, enclose an internal angle of approximately 90°. The rear edge and the upper edge, as in one form, enclose an interior angle of approximately 90°. The upper edge and the upper front edge, as in one form, enclose an interior angle of approximately 135°. The upper and lower front edges, as in one form, enclose an interior angle of approximately 105°. The lower front edge and the lower edge, as in one form, enclose an interior angle of about 120°. The feed pan 11w is pivotally hinged with its rear edge to the lower edge of the front panel 11v and is bent upwardly at its front edge and its left and right side edges by approximately 90°. The front panel 11f is integrally attached with its lower edge to the upper edge of the front panel 11v. The front panel 11v is pivotally hinged with its lower edge to the front edge of the bottom panel 11b. The bottom panel 11b is pivotally hinged with its rear edge to the lower edge of the rear panel 11h. The rear panel 11h is integrally attached with its upper edge to the rear edge of the top panel 11o. The top panel 11o is detachably connected at its front edge to the upper edge of the front panel 11f by means of two fasteners which, as in one form, are designed as tension fasteners or as toggle fasteners. The bottom panel 11b is integrally attached with its left side edge to the lower edge of the left side panel 11l, and with its right side edge to the lower edge of the right side panel 11r. In the closed state of the housing 11, as shown in FIG. 1, the left side panel 11l rests with its upper front edge against the left side edge of the front panel 11f, with its lower front edge against the left side edge of the front panel 11v, with its rear edge against the left side edge of the rear panel 11h, and with its upper edge against the left side edge of the top panel 11o. Accordingly, in the closed state of the housing 11, the right side panel 11r rests with its upper front edge against the right side edge of the front panel 11f, with its lower front edge against the right side edge of the front panel 11v, with its rear edge against the right side edge of the rear panel 11h, and with its upper edge against the right side edge of the top panel 11o.

In one form, seven scent openings 12 are formed in the front panel 11f. The scent openings 12 are arranged equidistantly in an upper and a lower row, respectively, in such a manner that three of the scent openings 12 are arranged in the upper row and the remaining four scent openings 12 are arranged in the lower row, and the three upper scent openings 12 are each arranged centrally above the gap between each of two adjacent lower scent openings 12. The three feed openings 11ö are each arranged in alignment below the three upper scent openings 12.

The device 10 comprises, in one form, seven sensors 13 (FIG. 6) which are uniquely associated with the scent openings 12, and thus one sensor 13 for each scent opening 12. The sensors 13 are embedded in the material of the inner layer 11f''' and in one form, are each designed as an IR light barrier.

In addition, the device 10 comprises a functional group 14 arranged in the housing 11, and a control device 15 (FIG. 3) coupled to the sensors 13 and the functional group 14 and attached, in one form, to the inside of the left side panel 11l. Each sensor 13 is designed such that it can monitor whether the animal puts its nose into the respective scent opening 12 and that, provided this is the case, it sends a corresponding notification signal to the control device 15.

FIG. 7, FIG. 8, FIG. 9, FIG. 10, and FIG. 11 schematically illustrate, one form of the functional group 14. In one form, the functional group 14 comprises seven scent groups 16, each comprising a target scent container 16z for receiving a target scent substance and a decoy scent container 16v for receiving a decoy scent substance. Target scent containers 16z and decoy scent containers 16v are also collectively referred to as scent containers 16vz. The scent groups 16 are uniquely associated with the scent openings 12. The functional group 14 comprises a reward device 17 for issuing a reward to the animal and, in one form, comprises three feed containers 17f. The feed containers 17f are attached to the upper side of the bottom panel 11b and adjacent to the front edge of the bottom panel 11b and are uniquely associated with the three feed openings 11ö so that the reward device 17 comprises a feed container 17f for each feed opening 11ö. The functional group 14 comprises a coupling device 18 for the scent groups 16, thus forming a coupling device 18 for the target scent containers 16z and the decoy scent containers 16v. The coupling device 18 and the reward device 17 are coupled to the control device 15. The control device 15 is designed such that it can activate the coupling device 18 and the reward device 17 in dependence on the notification signals and according to a predetermined program.

In one form, the device 10 comprises exactly one closure surface 19 (FIGS. 5, 6) for the scent containers 16vz, which thus forms both a closure surface 19 for the target scent containers 16z and a closure surface 19 for the decoy scent containers 16v. The closure surface 19 is formed on the inside of the inner layer 11f′″ and thus on the inside of the front panel 11f.

Each target scent container 16z has a closable target scent opening 20 surrounded by a sealing edge 20r, and each decoy scent container 16v has a closable decoy scent opening 21 surrounded by a sealing edge 21r.

The coupling device 18 comprises a drive device 22 for the scent containers 16vz, thus forming both a drive device 22 for the target scent containers 16z and a drive device 22 for the decoy scent containers 16v.

In one form, the drive device 22 comprises an upper and a lower support rail 23, which are attached with their left ends to the left side panel 11l and with their right ends to the right side panel 11r. The upper support rail 23 is horizontal and parallel to the lower support rail 23 and is offset rearwardly such that both support rails 23 extend parallel to the closure surface 19 at the same distance. Three of the scent groups 16 are moveably mounted on the upper support rail 23 and the remaining four scent groups 16 are moveably mounted on the lower support rail 23. The scent groups 16 are offset from each other in a manner similar to the scent openings 12.

In one form, the drive device 22 comprises seven electric motors 24 (FIG. 4) which are uniquely associated with the scent groups 16, that is, one electric motor 24 for each scent group 16. Each of these electric motors 24 is coupled to the control device 15 and can be individually activated by the latter. Each of these electric motors 24 is attached to the underside of the respective support rail 23 and drives a pinion (not shown). Each of these pinions meshes with an associated rack (not shown) which is attached to the respective scent group 16. Thus, each electric motor 24 can move the respective scent group 16 along the respective support rail 23 parallel to the closure surface 19 to a first, a second and a third position. In each of these first positions, the respective sealing edges 20r, 21r rest completely against the closure surface 19 in such a manner that the respective target scent opening 20 and the respective decoy scent opening 21 are covered by the closure surface 19 and are thus closed.

In each of these second positions, the respective target scent opening 20 and the respective scent opening 12 overlap and the respective sealing edge 21r rests against the closure surface 19 in such a manner that the respective decoy scent opening 21 is covered by the closure surface 19 and thus closed.

In each of these third positions, the respective decoy scent opening 21 and the respective associated scent opening 12 overlap and the respective sealing edge 20r rests completely against the closure surface 19 in such a manner that the respective target scent opening 20 is covered by the sealing surface 19 and thus closed.

Thus, the drive device 22 is designed in such a manner that it can move each target scent container 16z into a first position in which the respective sealing edge 20r rests completely against the closing surface 19 in such a manner that the respective target scent opening 20 is covered by the closing surface 19 and thus closed; can move each target scent container 16z to a second position in which the respective target scent opening 20 and the respective associated scent opening 12 overlap; can move each decoy scent container 16v to a first position in which the respective sealing edge 21r rests completely against the closure surface 19 in such a manner that the respective decoy scent opening 21 is covered by the closure surface 19 and thus is closed; can move each decoy scent container 16v to a second position in which the respective decoy scent opening 21 and the respective associated scent opening 12 overlap.

Each target scent container 16z assumes its first position when the respective scent group 16 assumes its first or its third position, and it assumes its second position when the respective scent group 16 assumes its second position. Each decoy scent container 16v assumes its first position when the respective scent group 16 assumes its first or its second position, and it assumes its second position when the respective scent group 16 assumes its third position.

Thus, the coupling device 18 is designed such that it can assume a closed state in which all of the scent containers 16vz are closed, and that it can assume, in one form, fourteen coupling states in each of which exactly one of the fourteen scent containers 16vz is open and fluidically coupled to one of the scent openings 12. It is also possible for the coupling device 18 to assume other coupling states instead of individual ones of these fourteen coupling states or in addition to these fourteen coupling states, in which at least two of the fourteen scent containers 16vz are open and fluidically coupled to corresponding scent openings 12.

FIG. 12, FIG. 13, FIG. 14, and FIG. 15 schematically illustrate in one form of the scent group 16. The scent group 16 comprises an angled support member 25, two retaining clips 26, and one scent container receptacle 27. The support member 25 includes a horizontal upper part and a vertical lower part. On the upper side of the upper part, the two retaining clips 26 are attached projecting upwards. The scent container receptacle 27 is attached to the rear side of the lower part. The target scent container 16z comprises a target scent vessel 28z into which the target scent substance is filled, and a target scent pipe 29z bent at 90° and having its lower edge tightly fitted on the upper edge of the target scent container 28z. The decoy scent container 16v is formed analogously thereto and comprises a decoy scent vessel 28v, into which the decoy scent substance is filled, and a 90° bent decoy scent pipe 29v, which is fitted with its lower edge tightly on the upper edge of the decoy scent container 28v. The scent container receptacle 27 has two vertical bores that are closed at the bottom, in which the scent vessels 28vz stand upright. The scent containers 16vz share a common sliding plate 30 which has an inclined sliding surface 30f parallel to the closure surface 19, into which two parallel, horizontal through-holes open out side by side. The left through-hole forms the target scent opening 20, the right through-hole forms the decoy scent opening 21, and the sliding surface 30f forms the sealing edges 20r, 21r. The target scent pipe 29z is tightly fitted with its front edge into the rear opening of the left through-hole, and the decoy scent pipe 29v is tightly fitted with its front edge into the rear opening of the right through-hole. Thus, the target scent vessel 28z and thus a target scent substance contained in its interior is fluidically connected to the target scent opening 20 via the target scent pipe 29z and the sliding plate 30, and the decoy scent vessel 28v and thus also a decoy scent substance contained in its interior is fluidically connected to the decoy scent opening 21 via the decoy scent pipe 29v and the sliding plate 30.

The scent container receptacle 27 has two vertical bores, closed at the bottom, in which the scent vessels 28vz stand upright.

The device 10 comprises a temperature control device for the scent containers 16vz. The temperature control device comprises, for each of the target scent containers 16z, a Peltier element 31 and a temperature sensor 32 which are seated between the bottom of the respective target scent vessel 28z and the bottom of the respective bore of the scent container receptacle 27, and, for each of the decoy scent containers 16v, a Peltier element 31 and a temperature sensor 32 which are seated between the bottom of the respective decoy scent vessel 28v and the bottom of the respective bore of the scent container receptacle 27. The temperature sensors 32 transmit the measured temperature values to the control device 15. Each Peltier element 31 is coupled to the control device 15 and can be individually activated by the control device 15 in dependence on the measured temperature values to selectively heat or cool the respective scent container 16vz and the scent contained therein to a predetermined temperature. The control device 15 is designed such that it controls the Peltier elements 31 and thus the temperature control device in dependence on the notification signals and according to the program.

In FIG. 16, FIG. 17, FIG. 18, and FIGS. 19a and 19b, in one form of the three feed containers 17f is shown schematically. Each feed container 17f includes a feed vessel 33 having a filling hopper 33t and a cylindrical interior. The filling hopper 33t opens vertically into the interior from above, so that treats in the form of feed pellets or feed chunks can be filled into the interior through the filling hopper 33t. The interior extends obliquely towards the rear and tilted upwardly by about 30° from the horizontal and has an externally threaded opening at its rear end and a bottom at its opposite front end. The bottom has a discharge hole 33l in an upper edge region. The discharge hole 33l is aligned with the respective feed opening 11ö. In one form, the feed vessel 33 is made in one piece from a plastic, such as, for example, a thermoplastic, polyethylene (PE), polypropylene (PP), polytetrafluoroethylene (PTFE), or polyurethane (PUR).

The feed container 17f comprises a hopper cover 34, a screw cover 35 with a central through-hole, a drive nut 36, and a feed driver 37 that comprises a hollow shaft 37w and a metering disc 37s with a recess (not shown). The hopper cover 34 is slidably fitted on the filling hopper 33t. The screw cover 35 is screwed onto the external thread.

The drive nut 36 is slid into the hollow shaft 37w and is connected to a flexible output shaft (not shown) of an electric motor (not shown) in a rotationally fixed manner. The reward device 17 comprises, for each of the feed containers 17f, such an electric motor attached to the underside of the lower support rail 23. The outer surface of the drive nut 36 engages the inner surface of the hollow shaft 37w such that rotating the drive nut 36 rotates the hollow shaft 37w.

The feed driver 37 is used for separating and transporting treats located in the interior and, in one form, is made in one piece from a plastic, such as, for example, a thermoplastic, polyethylene (PE), polypropylene (PP), polytetrafluoroethylene (PTFE), or polyurethane (PUR). The hollow shaft 37w is rotatably mounted with its upper end in the through-hole of the screw cover 35 and supports the metering disc 37s at its lower end. The metering disc 37s rests with its lower side against the bottom of the interior and has an outer diameter that is slightly smaller than the inner diameter of the interior. The recess is formed such that it can receive a single treat. When the feed driver 37 is rotated, a single treat falls into the recess and is pushed upwardly by the metering disc 37s to the discharge hole 33l, through which it slides into the respective feed opening 11ö and finally falls out of this feed opening 11ö into the feed pan 11w.

In one form, the device includes a signaling device for generating a signal for the animal. In one form, the signaling device comprises a speaker 38 coupled to the control device 15 and, in one form, is attached to the inside of the left side panel 11l. The control device 15 is designed such that it is able to activate the speaker 38 and thus the signaling device in dependence on the notification signals and according to the program. The control device 15 controls the speaker 38 in such a manner that it generates an acoustic signal, which, in one form, is a click such as is generated by a clicker used in clicker training. In one form, this clicker is then later used during the animal's deployment in the field.

In one form, the device 10 comprises a data memory 39 coupled to the control device 15 in which data desired by the program is stored and in which the control device 15 stores data processed by the program. In one form, the data storage 39 is a hard disk drive.

Figure 20:
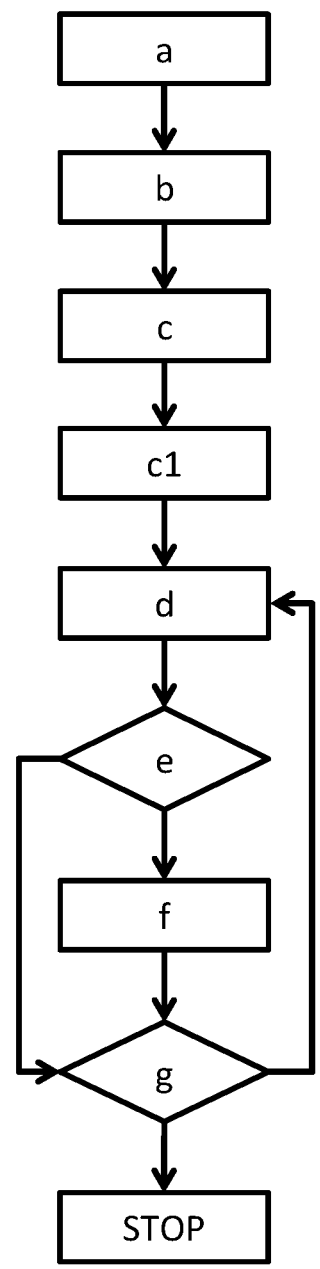
FIG. 20 is flowchart of one form of a method for a scent training of an animal, using the device of FIG. 1, according to the teachings of the present disclosure.

In FIG. 20, in one form of a method for scent training an animal is schematically shown as a flowchart. In one form, the method in this form is carried out by means of and using the device 10. The device 10 is designed such that it is able to perform this form.

In a step a, the device 10 is provided. Thus, the housing 11 having the front panel 11f in which the seven scent openings 12 are formed, the seven closable target scent containers 16z for receiving a target scent substance, and the seven closable decoy scent containers 16v for receiving a decoy scent substance are provided. Also provided are the feed pan 11w, the control device 15, the reward device 17 including the three feed containers 17f, the coupling device 18 including the drive device 22, the closure surface 19, the signaling device including the speaker 38, the data memory 39, and the temperature control device including the fourteen Peltier elements 31 and the fourteen temperature sensors 32.

In a step b after the step a, a target scent container 16z, namely the respective target scent vessel 28z, is filled with a target scent substance, and a decoy scent container 16v, namely the respective decoy scent vessel 28v, is filled with a decoy scent substance. In this form, the target scent substances are similar, and the decoy scent substances are similar.

Furthermore, in this step, treats in the form of feed pellets or food chunks are filled into the three feed containers 17*f*.

In a step c after the step b, the closed state in which the target scent containers 16*z* and the decoy scent containers 16*v* are closed is established. This is done by means of the control device 15, the drive device 22 and the closure surface 19.

In addition, in this step, each of the scent containers 16*vz* and the respective scent substance contained therein are brought to a predetermined temperature. This is done by means of the control device 15 and the temperature control device.

In a step c1 after step c, seven different coupling states are predetermined, and a count variable is set to zero. This is done by means of the control device 15 and the data memory 39. The first of these seven coupling states is defined in that the first target scent container 16*z*, thus, the target scent container 16*z* of the first scent group 16, is opened and fluidically coupled to the respective associated scent opening 12, thus, the first scent opening 12, which is shown in FIG. 1 in the bottom row on the far left, by means of the respective target scent pipe 29*z* and the respective sliding plates 30, the six remaining target scent containers 16*z* are closed by means of the coupling device 18, the first decoy scent container 16*v*, thus, the decoy scent container 16*v* of the first scent group 16, is closed by means of the coupling device 18, the second decoy scent container 16*v*, thus, the decoy scent container 16*v* of the second scent group 16, is opened and fluidically coupled to the respective associated scent opening 12, thus, the second scent opening 12 which is shown in FIG. 1 in the top row on the far left, by means of the respective decoy scent pipe 29*v* and the respective sliding plate 30, the third decoy scent container 16*v*, thus, the decoy scent container 16*v* of the third scent group 16, is opened and fluidically coupled to the respectively associated scent opening 12, thus, the third scent opening 12 which is shown in FIG. 1 in the bottom row as second from the left, by means of the respective decoy scent pipe 29*v* and the respective sliding plate 30, the fourth decoy scent container 16*v*, thus, the decoy scent container 16*v* of the fourth scent group 16, is opened and fluidically coupled to the respective associated scent opening 12, thus the fourth scent opening 12 which is shown in the upper line in the center in FIG. 1, by means of the respective decoy scent pipe 29*v* and the respective sliding plates 30, the fifth decoy scent container 16*v*, thus, the decoy scent container 16*v* of the fifth scent group 16, is opened and fluidically coupled to the respective associated scent opening 12, thus the fifth scent opening 12 which is shown in FIG. 1 in the bottom row as second from the right, by means of the respective decoy scent pipe 29*v* and the respective sliding plates 30, the sixth decoy scent container 16*v*, thus the decoy scent container 16*v* of the sixth scent group 16, is opened and fluidically coupled to the respective associated scent opening 12, thus the sixth scent opening 12 which is shown in FIG. 1 in the upper row on the far right, by means of the respective decoy scent pipe 29*v* and the respective sliding plate 30, and the seventh decoy scent container 16*v*, thus, the decoy scent container 16*v* of the seventh scent group 16, is opened and fluidically coupled to the respective associated scent opening 12, thus, the seventh scent opening 12 which is shown in FIG. 1 in the bottom row on the far right, by means of the respective decoy scent pipe 29*v* and the respective sliding plates 30.

The second coupling state is defined in that the second target scent container 16*z*, thus the target scent container 16*z* of the second scent group 16, is opened and fluidically coupled to the second scent opening 12 by means of the respective target scent pipe 29*z* and the respective sliding plate 30, the six remaining target scent containers 16*z* are closed by means of the coupling device 18, the second decoy scent container 16*v* is closed by means of the coupling device 18, and each of the six remaining decoy scent containers 16*v* is opened and fluidically coupled to the respective scent opening 12 by means of the respective decoy scent pipe 29*v* and the respective sliding plate 30.

The third coupling state is defined in that the third target scent container 16*z*, thus, the target scent container 16*z* of the third scent group 16, is opened and fluidically coupled to the third scent opening 12 by means of the respective target scent pipe 29*z* and the respective sliding plate 30, the six remaining target scent containers 16*z* are closed by means of the coupling device 18, the third decoy scent container 16*v* is closed by the coupling device 18, and each of the six remaining decoy scent containers 16*v* is opened and fluidically coupled to the respective scent opening 12 by means of the respective decoy scent pipe 29*v* and the respective sliding plate 30.

The fourth coupling state is defined in that the fourth target scent container 16*z*, thus, the target scent container 16*z* of the fourth scent group 16, is opened and fluidically coupled to the fourth scent opening 12 by means of the respective target scent pipe 29*z* and the respective sliding plate 30, the six remaining target scent containers 16*z* are closed by means of the coupling device 18, the fourth decoy scent container 16*v* is closed by the coupling device 18, and each of the six remaining decoy scent containers 16*v* is opened and fluidically coupled to the respective scent opening 12 by means of the respective decoy scent pipe 29*v* and the respective sliding plate 30.

The fifth coupling state is defined in that the fifth target scent container 16*z*, thus, the target scent container 16*z* of the fifth scent group 16, is opened and fluidically coupled to the fifth scent opening 12 by means of the respective target scent pipe 29*z* and the respective sliding plate 30, the six remaining target scent containers 16*z* are closed by means of the coupling device 18, the fifth decoy scent container 16*v* is closed by the coupling device 18, and each of the six remaining decoy scent containers 16*v* is opened and fluidically coupled to the respective scent opening 12 by means of the respective decoy scent pipe 29*v* and the respective sliding goggle 30.

The sixth coupling state is defined in that the sixth target scent container 16*z*, thus, the target scent container 16*z* of the sixth scent group 16, is opened and fluidically coupled to the sixth scent opening 12 by means of the respective target scent pipe 29*z* and the respective sliding plate 30, the six remaining target scent containers 16*z* are closed by means of the coupling device 18, the sixth decoy scent container 16*v* is closed by the coupling device 18, and each of the six remaining decoy scent containers 16*v* is opened and fluidically coupled to the respective scent opening 12 by means of the respective decoy scent pipe 29*v* and the respective sliding plate 30.

The seventh coupling state is defined in that the seventh target scent container 16*z*, thus, the target scent container 16*z* of the seventh scent group 16, is opened and fluidically coupled to the seventh scent opening 12 by means of the respective target scent pipe 29*z* and the respective sliding plate 30, the six remaining target scent containers 16*z* are closed by means of the coupling device 18, the seventh decoy scent container 16*v* is closed by the coupling device 18, and each of the six remaining decoy scent containers 16*v* is opened and fluidically coupled to the respective scent opening 12 by means of the respective decoy scent pipe 29v and the respective sliding plate 30.

In a step d after step c1, a coupling state is selected from these seven coupling states and a first time measurement is started at a predetermined first point in time. This is done by means of the control device 15 and the data memory 39. In one form, the control device 15 comprises a random number generator, with the aid of which the control device carries out the selection.

In addition, the selected coupling state is established in this step. This is done by means of the control device 15, the drive device 22 and the closure surface 19.

In a step e after step d, for that scent opening 12 which is coupled to the corresponding target scent container 16z according to the selected coupling state, it is monitored whether the animal puts its nose into this scent opening 12 and, provided this is the case, a corresponding notification signal is generated. This is done by means of the control device 15 and the sensors 13.

In addition, in this step, the first time measurement is stopped and simultaneously a second time measurement is started as soon as the notification signal is generated, and the second time measurement is stopped as soon as this notification signal is no longer generated or as soon as a predetermined first time period, during which this notification signal has been continuously generated, has elapsed. This is done by means of the control device 15 and the sensors 13.

In addition, in this step, the first time measurement is canceled as soon as a predetermined second time period has elapsed without the notification signal having been generated. This is done by means of the control device 15 and the sensors 13.

In addition, in this step, the results of the time measurements and the cancellation of the first time measurement are stored. This is done by means of the control device 15 and the data memory 39.

In addition, in this step, the closing state is established after the second time measurement has stopped, and the closing state is established after the first time measurement is canceled. This is done by means of the control device 15, the drive device 22 and the closure surface 19.

If the first time measurement has been canceled, the process jumps to a step g.

In a step f after step e, if the duration of the second time measurement exceeds a predetermined threshold or if the first time period has elapsed, the animal is rewarded in a predetermined manner at a predetermined second point in time after the second time measurement is stopped by dispensing a treat into the feed pan 11w through a predetermined feed opening 11ö; otherwise, that is, if the duration of the second time measurement does not exceed the threshold or if the first time period has not elapsed, the animal is not rewarded. This is done by means of the control device 15 and the reward device 17. The first scent opening 11ö shown in FIG. 1 on the far left is associated with the first and second scent openings 12, the second scent opening 11ö shown in FIG. 1 in the middle is associated with the third, fourth and fifth scent openings 12, and the third scent opening 11ö shown in FIG. 1 on the far right is associated with the sixth and seventh scent openings 12. If in the step d the first or second coupling state has been selected, then rewarding is performed by dispensing a treat from the first feed opening 11ö by means of the associated first feed container 17f. If in the step d the third, fourth or fifth coupling state has been selected, then the rewarding is performed by dispensing a treat from the second feed opening 11ö by means of the associated second feed container 17f. If the sixth or seventh coupling state has been selected in step d, then rewarding is performed by dispensing a treat from the third feed opening 11ö by means of the associated third feed container 17f. Thus, the animal is rewarded in a predetermined manner in dependence on the notification signals.

In addition, in this step, at a predetermined third point in time after the second time measurement is stopped, a click is generated if the duration of the second time measurement exceeds a predetermined threshold value or if the first time period has elapsed; otherwise, that is, if the duration of the second time measurement does not exceed the threshold value or if the first time period has not elapsed, this signal is not generated. This is done by means of the control device 15 and the signaling device. Thus, a predetermined signal is generated for the animal in in dependence on the notification signals. In one form, the third point in time is equal to the second point in time.

In step g after step f, the count variable is incremented and compared to a predetermined threshold which, in one form, is 9. This is done by means of the control device 15.

If the count variable is smaller than the threshold value, a jump is made to step d, otherwise the method is terminated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller," "control device," and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for scent training an animal, the device comprising:
   a housing having a front panel, wherein the front panel defines at least two scent openings;
   at least one sensor for each of the at least two scent openings;
   at least one closeable target scent container configured to receive a target scent substance;
   a coupling device for the at least one closeable target scent container;
   a reward device configured to provide a reward to the animal;
   a control device electrically coupled to the sensors; and
   at least one closure surface for the at least one closeable target scent container, wherein:
      each sensor is configured to monitor whether the animal puts its nose into a respective scent opening and, provided this is the case, to send a notification signal to the control device;
      the coupling device is configured to be in a closed state in which the at least one closeable target scent container is closed and to be in at least one coupling state in which at least one predetermined target scent container is opened and is fluidically coupled to at least one predetermined scent opening of the at least two scent openings; and
      the control device is configured to activate the coupling device and the reward device in dependence on the notification signal, according to a predetermined program, or a combination thereof;
   the at least one closeable target scent container has a closable target scent opening surrounded by a first sealing edge;
   the coupling device comprises a drive device for the at least one closeable target scent container; and
   the drive device is configured to:
      move the at least one closeable target scent container into a first position, in which the first sealing edge rests completely against the at least one closure surface in such a manner that the closeable target scent opening is closed; and
      move the at least one closeable target scent container into a second position, in which the closeable target scent opening and one scent opening of the at least two scent openings at least partially overlap.

2. The device according to claim 1, wherein:
   the coupling device is configured to operate in at least two coupling states; and is further configured to:
      select one of the at least two coupling states;
      start a first time measurement at a predetermined first point in time and activate the coupling device such that the coupling device assumes the selected one of the at least two coupling states;
      stop the first time measurement and simultaneously start a second time measurement in response to receiving the notification signal from one of the sensors associated with a respective scent opening;
      stop the second time measurement in response to not receiving the notification signal from the one of the sensors; and
      in response to a duration of the second time measurement exceeding a predetermined threshold value, activate the reward device at a predetermined second point in time, after the second time measurement is stopped, in such a manner that the reward device issues a predetermined reward.

3. The device according to claim 1 further comprising a signaling device configured to generate a signal for the animal, wherein the control device is electrically coupled to the signaling device and the control device is configured to activate the signaling device in dependence on the notification signal, according to the predetermined program, or a combination thereof.

4. The device according to claim 1 further comprising at least one closable decoy scent container for receiving a decoy scent substance, wherein:
   the coupling device is a coupling device for the at least one closable decoy scent container;
   in the closed state, the at least one closable decoy scent container is closed;
   the at least one coupling state, at least one predetermined closable decoy scent container is opened and fluidically coupled to at least one predetermined scent opening.

5. The device according to claim 4 further comprising at least one closure surface for the at least one closable decoy scent container, wherein:
   the at least one closable decoy scent container has a closable decoy scent opening surrounded by a second sealing edge;
   the coupling device comprises a drive device for the at least one closable decoy scent container; and
   the drive device for the at least one closable decoy scent container is configured to:
      move the at least one closable decoy scent container into a first position, wherein the second sealing edge can rest completely against the at least one closure surface in such a manner that the closable decoy scent opening is closed; and
      move the at least one closable decoy scent container into a second position, wherein the closable decoy scent opening and another scent opening of the at least two scent openings at least partially overlap.

6. The device according to claim 4 further comprising a temperature control device for at least one of the at least one closeable target scent container, the at least one closable decoy scent container, or a combination thereof, wherein:
   the control device is electrically coupled to the temperature control device; and
   the control device is configured to activate the temperature control device in dependence on the notification signal, according to the predetermined program, or a combination thereof.

7. The device according to claim 1 further comprising a data memory electrically coupled to the control device; and wherein the data memory stores at least part of the predetermined program and/or at least a part of data utilized by the predetermined program, at least a part of data processed by the predetermined program, or a combination thereof.

8. The device according to claim 1 further comprising:
   a remote control device for the control device; and a communication device capable of establishing a wireless connection, wired connection, or a combination thereof between the control device and the remote control device.

9. A method for scent training an animal using a device configured according to claim 1, wherein:
in a step a, providing the housing having the front panel wherein the front panel defines the at least two scent openings; and providing the at least one closeable target scent container adapted to receive the target scent substance;
in a step b, filling the target scent substance into the at least one closeable target scent container;
in a step c, creating the closed state, in which the at least one closeable target scent container is closed by moving the at least one closeable target scent container into the first position, in which the first sealing edge rests completely against the at least one closure surface in such a manner that the closable target scent opening is closed;
in a step d, after the step c, creating the at least one coupling state, in which the at least one predetermined target scent container is opened and fluidically coupled to the one scent opening of the at least two scent openings by moving the at least one closeable target scent container into the second position, in which the closable target scent opening and the one scent opening of the at least two scent openings at least partially overlap;
in a step e, after said step d, monitoring whether the animal puts its nose into the one scent opening;
generating, in response to the animal putting its nose into the one scent opening, the notification signal; and
in a step f, after the step e, rewarding the animal in dependence on the notification signal.

10. The method according to claim 9, wherein:
in the step d, selecting the at least one coupling state from a plurality of predetermined coupling states; and starting, at a predetermined first point in time, a first time measurement;
in the step e, stopping the first time measurement and starting simultaneously a second time measurement as soon as the notification signal is generated; and stopping the second time measurement as soon as the notification signal is no longer generated; and
in the step f, when a duration of the second time measurement exceeds a predetermined threshold, rewarding the animal in a predetermined manner at a predetermined second point in time after the second time measurement is stopped.

11. The method according to claim 10, wherein in the step e, canceling the first time measurement as soon as a predetermined time period has elapsed without the notification signal having been generated.

12. The method according to claim 10, wherein one or more results of time measurements, a cancelation of the first time measurement, or a combination thereof is stored in a data memory.

13. The method according to claim 10, wherein:
a step g, after the step f, a jump is made to the step c or d;
a number of executions of step g is predetermined, limited by a predetermined time period, or a combination thereof; and
in the step g, the at least one coupling state, the predetermined first point in time, the predetermined second point in time or a combination thereof is changed.

14. The method according to claim 10, wherein the at least one closeable target scent container includes a plurality of closeable target scent containers, and wherein prior to step d or prior to the predetermined first point in time, at least one of the plurality of closeable target scent containers is brought to a predetermined temperature.

15. The method according to claim 9, wherein:
in the step a, at least one closable decoy scent container for receiving a decoy scent substance is provided;
in step b, a decoy scent substance is filled into the at least one closable decoy scent container, wherein
in the closed state, the at least one closable decoy scent container is closed;
in the at least one coupling state, at least one predetermined closable decoy scent container is opened and fluidically coupled to at least one predetermined scent opening.

16. The method according to claim 9, wherein the step f, after the step e, further comprises generating a predetermined signal for the animal.

\* \* \* \* \*